United States Patent
Ojima et al.

(10) Patent No.: US 7,480,118 B2
(45) Date of Patent: Jan. 20, 2009

(54) PICKER MECHANISM THAT ROTATABLY ACCESSES DATA CARTRIDGES AT DIFFERENT HEIGHTS AND LIBRARY DEVICE USING SAME

(75) Inventors: Kenichi Ojima, Tokyo (JP); Manabu Tsuchiya, Tokyo (JP)

(73) Assignee: NEC Corporation, Tokyo (JP)

( * ) Notice: Subject to any disclaimer, the term of this patent is extended or adjusted under 35 U.S.C. 154(b) by 420 days.

(21) Appl. No.: 11/040,848

(22) Filed: Jan. 21, 2005

(65) Prior Publication Data

US 2005/0162775 A1   Jul. 28, 2005

(30) Foreign Application Priority Data

Jan. 22, 2004 (JP) .............................. 2004-014389

(51) Int. Cl.
G11B 15/68 (2006.01)
(52) U.S. Cl. .................... 360/92; 369/30.45; 369/30.57
(58) Field of Classification Search .................. 360/92; 369/30.45, 30.57
See application file for complete search history.

(56) References Cited

U.S. PATENT DOCUMENTS 5,255,251 A * 10/1993 Fitzgerald et al. ........ 369/30.45
5,793,563 A * 8/1998 Katsuyama et al. ........... 360/92
6,327,113 B1 * 12/2001 Mueller et al. ................ 360/92

FOREIGN PATENT DOCUMENTS

| JP | 60-243864   | 12/1985 |
|----|-------------|---------|
| JP | 03-20059    | 2/1991  |
| JP | 03-35468    | 2/1991  |
| JP | 05-135462   | 6/1993  |
| JP | HEI 10-040615 | 2/1998 |
| JP | 2000-251373 | 9/2000  |
| JP | 2002-269875 | 9/2002  |
| JP | 2003-506811 | 2/2003  |
| JP | 2003-157599 | 5/2003  |

* cited by examiner

Primary Examiner—A. J. Heinz
(74) Attorney, Agent, or Firm—Scully, Scott, Murphy & Presser, P.C.

(57) ABSTRACT

A picker mechanism and a library device having the picker mechanism are provided in which their miniaturization can be achieved. A drive device mounted on the library device and the picker mechanism to load and unload data cartridges to and from a cell in a magazine include a swivel mechanism made up of a swivel driving motor to rotate the picker mechanism on an elevator that supports the picker mechanism, a feeding section having a picker arm on its side that is connected to a notch to be held in a fixed manner which is formed on a side of the data cartridge and, a feeding section driving mechanism made up of a picker driving motor to move the feeding section in a straight line.

10 Claims, 18 Drawing Sheets

- 100; data cartridge
- 200; magazine
- 300; cell
- 510; picker frame
- 521
- 520; feeding section
- 419; elevator
- 500; picker mechanism

- 100
- 110
- 520
- 522
- 521
- 523
- 530

- 521
- 419  X direction
- 500

- 300
- 100
- Y
- 510
- 520
- 530

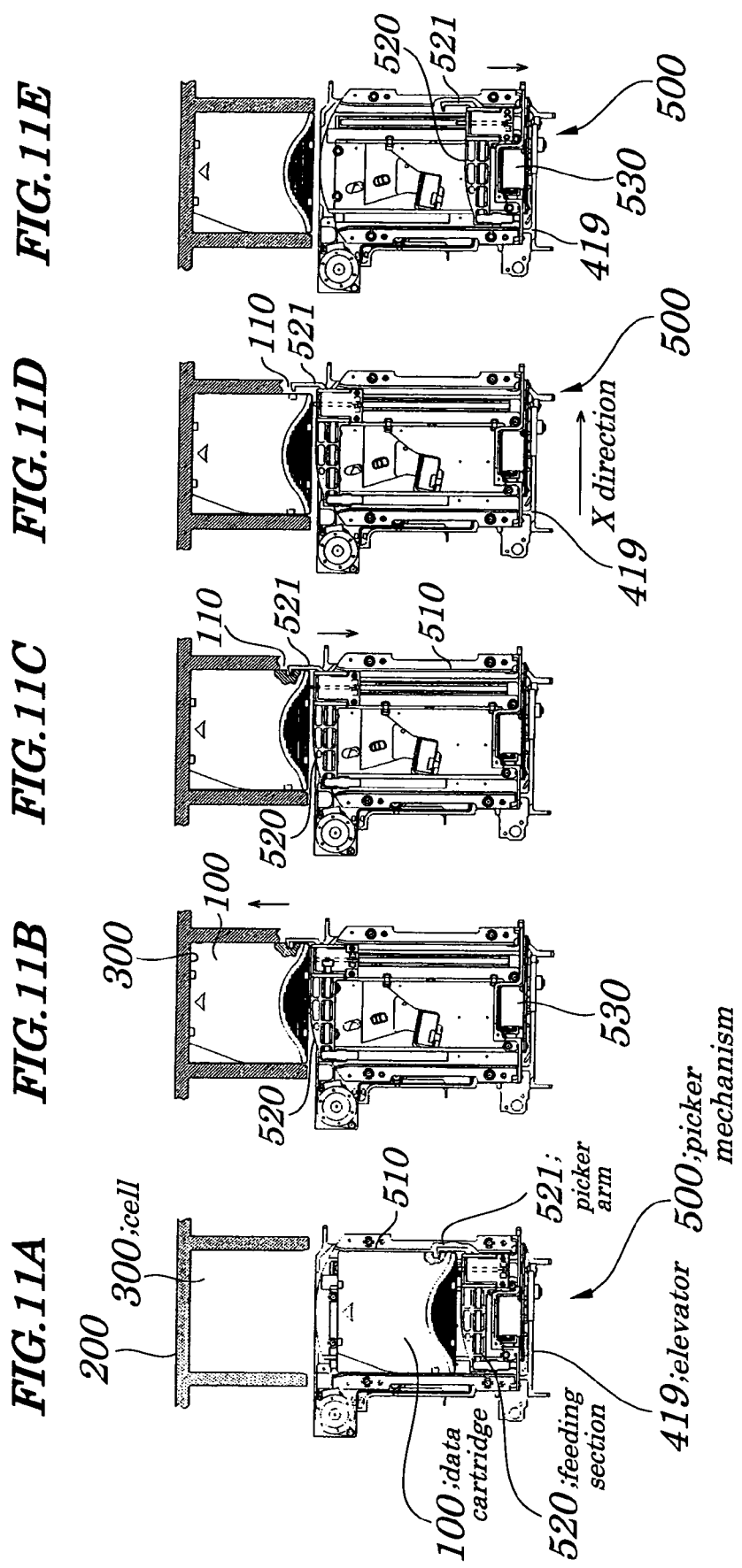

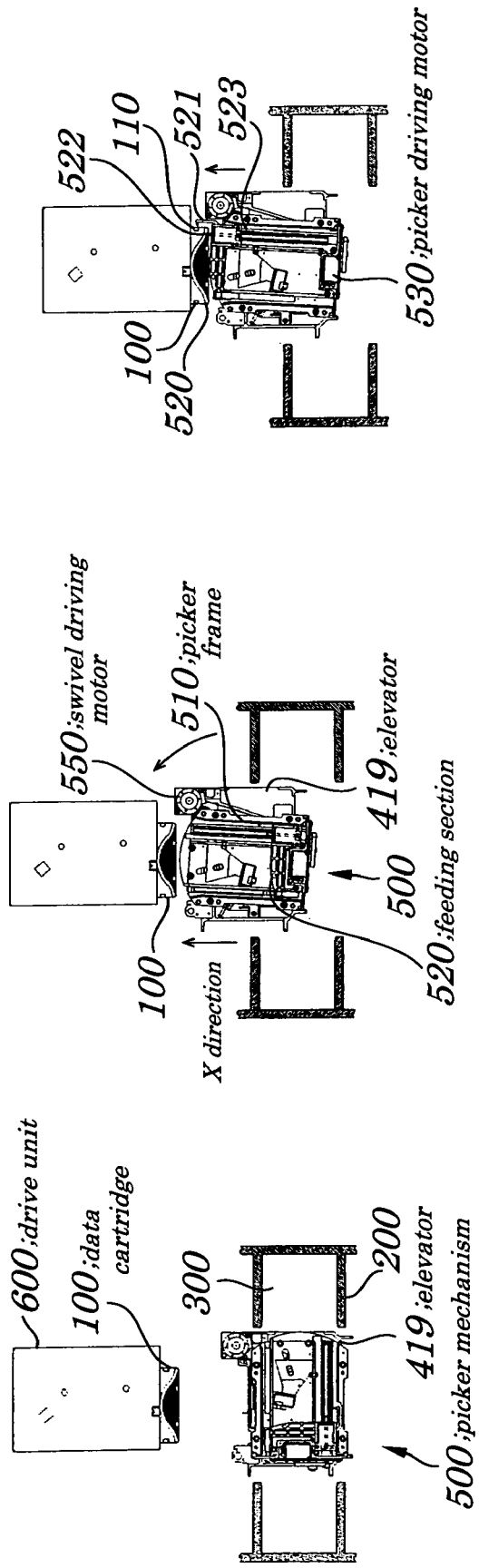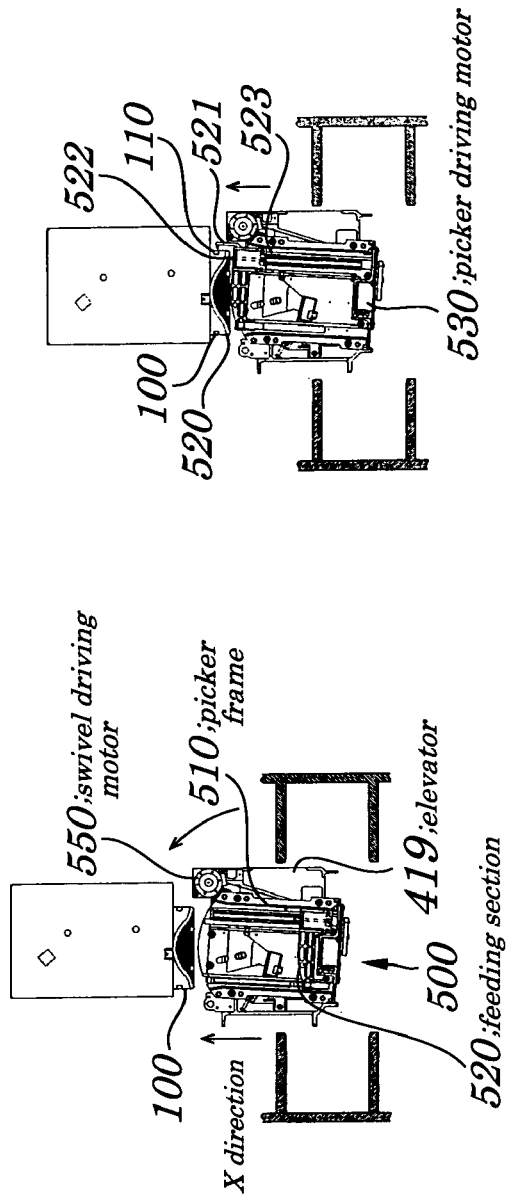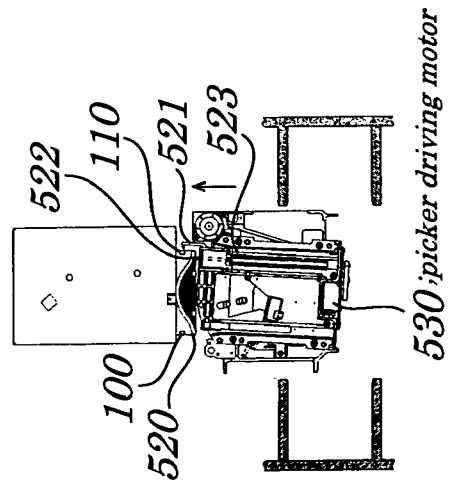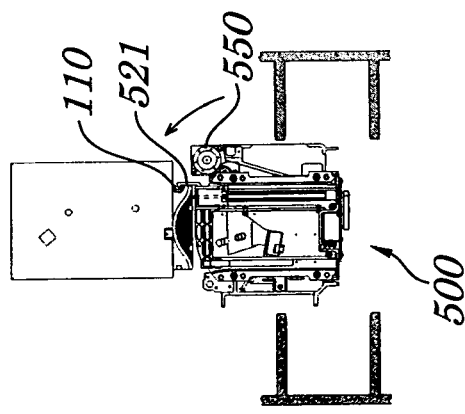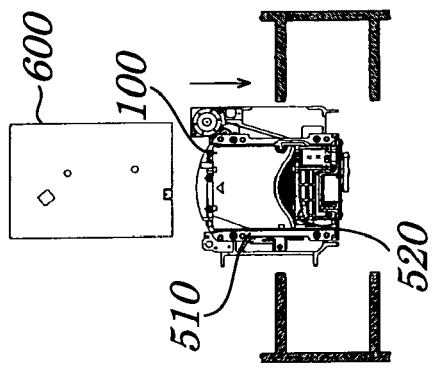

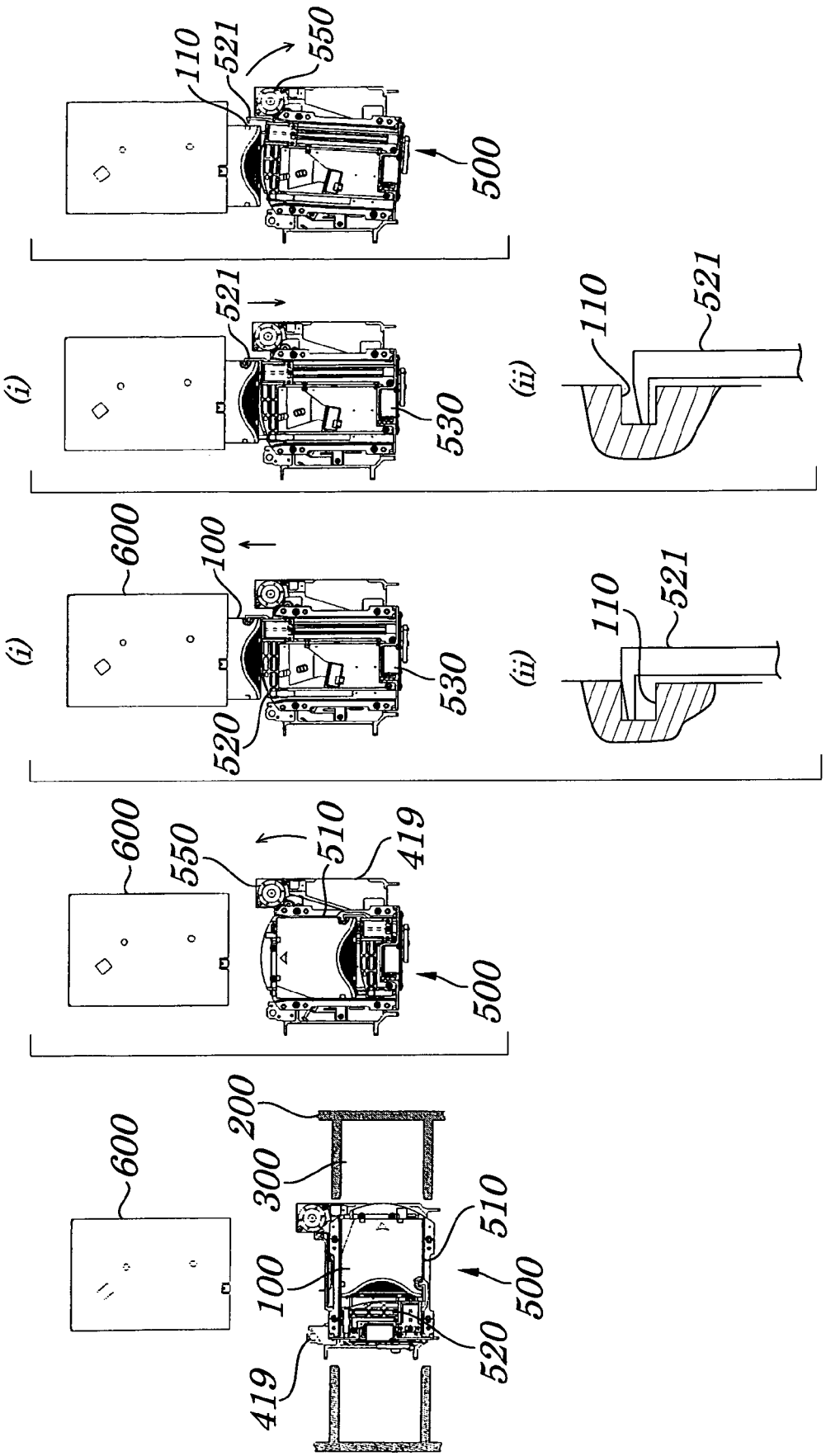

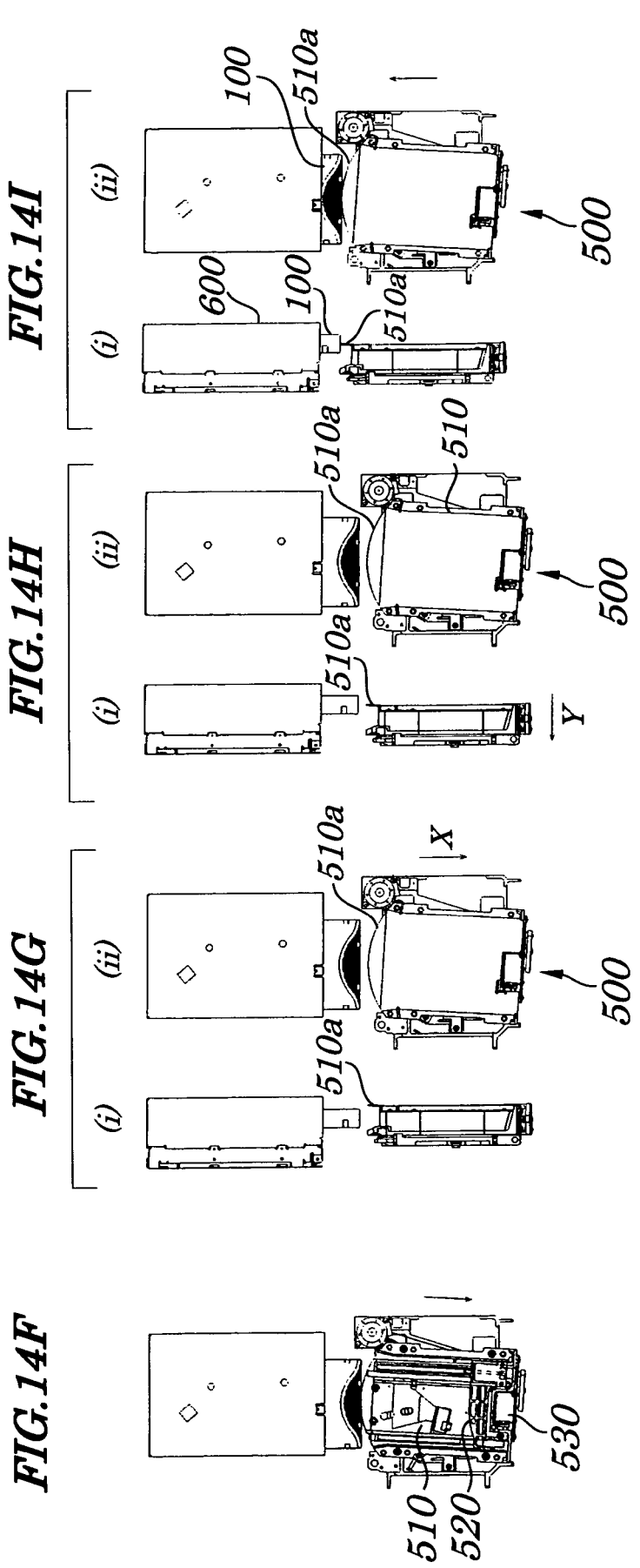

PICKER MECHANISM THAT ROTATABLY ACCESSES DATA CARTRIDGES AT DIFFERENT HEIGHTS AND LIBRARY DEVICE USING SAME

BACKGROUND OF THE INVENTION

1. Field of the Invention

The present invention relates to a library device to store a plurality of data cartridges including a magnetic tape, magnetic disk, optical disk, magneto-optical disk, or a like and to selectively unload a desired data cartridge out of these data cartridges to read and/or write data from or onto storage media housed in the data cartridge by using a drive device mounted internally and to a picker mechanism making up the library device.

The present application claims priority of Japanese Patent Application No. 2004-014389 filed on Jan. 22, 2004, which is hereby incorporated by reference.

2. Description of the Related Art

A conventional library device (called a data storage system or a like in some cases) is known which is disclosed, for example, in Japanese Patent Application Laid-open No. 2002-269875 in which data cartridges are stored in a plurality of cells housed in a plurality of magazines and a desired data cartridge is selectively unloaded from these data cartridges, and data stored in the cartridge is read and/or written by using a drive device.

FIG. 15 is a plan view illustrating configurations of a conventional data storage system disclosed in the Japanese Patent Application Laid-open No. 2002-269875.

A cartridge carrying system 1101 included in the data storage system 1100 shown in FIG. 15 is used to move a data cartridge 1104 between a plurality of cartridge magazines 1102 and a plurality of cartridge reading/writing device 1103. As shown in FIG. 15, the plurality of cartridge magazines 1102 and the plurality of cartridge reading/writing device 1103 are arranged in various positions within the data storage system 1100 in a manner to be approximately U-shaped.

The cartridge carrying system 1101 includes a U-shaped lower guiding member, that is, a lower plate 1108 having a U-shaped lower groove 1107 and a U-shaped upper guiding member, that is, an upper plate (not shown) having a groove (not shown), which are together used to guide a cartridge access device 1105 along an approximately U-shaped path 1106, so that the cartridge access device 1105 gains access to data cartridges 1104 housed in the plurality of cartridge magazines 1102 and the plurality of cartridge reading/writing devices 1103.

The cartridge access device 1105 partially includes a cartridge positioning system 1109 to move the cartridge access device 1105 along the cartridge magazines 1102 and the cartridge reading/writing devices 1103 in various positions (for example, positions 1140, 1140', and 1140") so that the cartridge access device 1105 gains access to data cartridges 1104 being housed in the cartridge magazines 1102 and cartridge reading/writing devices 1103.

The cartridge access device 1105 moves along the U-shaped lower groove 1107 formed on the lower plate 1108 (the lower guiding member) and the U-shaped upper groove (not shown) formed on the upper plate (the upper guiding member), that is, along the U-shaped path 1106, by an actuator system 1110. The actuator system 1110 includes a rack pinion driving system having gear racks placed in a position adjacent to the groove 1107 in the lower plate 1108 and being substantially connected to one another.

Moreover, such a library device as described above is equipped with a picker mechanism to bring data cartridges in or from the cartridge magazines and cartridge reading/writing devices. FIG. 16 is a perspective view showing one conventional example of such a picker mechanism 1200. FIG. 17 is a perspective view illustrating a state in which the picker mechanism 1200 of FIG. 16 holds data cartridges 1240.

The picker mechanism 1200 shown in FIG. 16 includes a feeding section 1210 being made to move in an $A_1$ to $A_2$ direction shown in FIG. 16 by a driving means (not shown) on a main body 1201 and right and left picker arms 1220a and 1220b are provided on both right and left sides of the feeding section 1210. Both the right picker arm 1220a and left picker arm 1220b are configured to rotate and open as shown in FIG. 16 by a cam mechanism (not shown) when the right and left picker arms 1220a and 1220b move to a top end in the $A_2$ direction shown in FIG. 16 and close when the feeding section 1210 starts to move to the $A_1$ direction shown in FIG. 16.

In the picker mechanism 1200, for example, as shown in FIG. 17, with the feeding section 1210 having been moved to a top end in the $A_2$ direction (see FIG. 16), if the feeding section 1210 is moved after the feeding section 1210 has been placed in a position where the feeding section 1210 faces the data cartridges 1240 housed in a cartridge magazine 1230, the right and left picker arms 1220a and 1220b close and their hooks are held in a fixed manner in grooves 1241 on both sides of the data cartridges 1240 and the right and left picker arms 1220a and 1220b hold the data cartridge 1240 and draw the data cartridge 1240 into a main body 1201. The picker mechanism 1200 thus draws the data cartridges 1240 out of the cartridge magazine 1230. The operation of inserting the data cartridges 1240 from the picker mechanism 1200 into the cartridge magazine 1230 is performed in a retrograde order being opposite to the above operations.

Moreover, as shown in FIG. 16, the picker mechanism 1200 having the right and left picker arms 1220a, 1220b on its both sides is disclosed, for example, in Japanese Patent Application Laid-open No. 2003-157599.

FIG. 18 is a perspective view illustrating configurations of another conventional picker mechanism 1300 disclosed in Japanese Patent Application Laid-open No. Hei10-040615.

The picker mechanism 1300 shown in FIG. 18 includes a main body 1301 having a female screw section 1301a that can fit into a screw shaft (not shown) and a picker arm 1310 that can rotate about a shaft 1311. The picker mechanism 1300 can move in a $B_{1\ to\ B2}$ direction shown in FIG. 18 by making the screw shaft (not shown) rotate in a normal or reverse direction. Moreover, the picker arm 1310 is so configured as to be rotational in an arbitrary way irrespective of an arrangement position of the picker mechanism 1300.

The picker mechanism 1300, as shown in FIG. 18, for example, after having been placed in a position facing the data cartridges 1320 housed in the cartridge magazine (not shown), rotates the picker arm 1310 and makes its hook (not shown) be held in a fixed manner in a groove 1321 formed on one side of the data cartridges 1320. The picker mechanism 1300, by being moved in a $B_1$ direction with the above state being kept as it is, draws the data cartridges 1320 out of the cartridge magazine (not shown). The operation of inserting the data cartridge 1320 from the picker mechanism 1300 into the cartridge magazine (not shown) is performed in a retrograde order being opposite to the above operation.

FIG. 19 is a perspective view illustrating configurations of still another conventional picker mechanism 1400 disclosed in Japanese Patent Application Laid-open No. 2000-251373.

The picker mechanism 1400 shown in FIG. 19, by using a driving force of a motor 1403 and a tensile strength of a spring 1402, has a picker arm 1401 that can rotate about a shaft 1404 in a C direction shown by an arrow in FIG. 19. The picker mechanism 1400 shown in FIG. 19 can be moved by using a driving means (not shown) in a $D_1$ to $D_2$ direction shown in FIG. 19. The picker mechanism 1400 differs from the picker mechanisms 1200 and 1300 shown in FIGS. 16 and 18 in that the picker arm 1401 moves in a vertical direction.

The picker mechanism 1400, as shown in FIG. 19, for example, after having been placed in a position facing data cartridges 1410 housed in a cartridge magazine 1420, rotates the picker arm 1401 and makes its hook (not shown) be held in a fixed manner in a groove 1411 on a lower side of the data cartridges 1410 be held in a fixed manner. The picker mechanism 1400, by moving in a $D_1$ direction with the above state being kept as it is, draws the data cartridges 1410 out of the cartridge magazine 1420. The operation of inserting the data cartridges 1410 from the picker mechanism 1400 into the cartridge magazine 1420 is performed in a retrograde order being opposite to the above operation.

As described above, the data storage system 1100 (library device) shown in FIG. 15 is so configured that the cartridge access device 1105 moves along the U-shaped path 1106 by the actuator system 1110. Therefore, for example, in order to transfer the data cartridges 1104 housed in a certain cartridge magazine 1102 to another cartridge magazine 1102 facing the data cartridge 1104 with the U-shaped path 1106 being interposed between cartridge magazines 1102, it is necessary that the cartridge access device 1105 is moved in a manner in which the cartridge access device 1105 bypasses greatly along the U-shaped path 1106. In the data storage system 1100 configured as above, much time is required for moving the data cartridges 1104 which causes a big problem in improving a processing speed of the library device (Data storage system 1100).

Moreover, the picker mechanism 1200 having the right and left picker arms 1220a and 1220b on its both sides shown in FIG. 16 or a like requires a complicated opening and closing mechanism (not shown) for opening and closing the right and left picker arms 1220a and 1220b to catch the data cartridge 1240 (FIG. 17) and therefore it causes the picker mechanism 1200 and, as a result, the library device having the picker mechanism 1200 to be made large which leads to an obstacle to miniaturization of the library device. Furthermore, as shown in FIG. 17, in a position where the picker mechanism 1200 transfers and receives the data cartridges 1240, since it is necessary to provide space for opening and closing the right and left picker arms 1220a and 1220b, also causing the library device to become large.

On the other hand, the picker mechanism 1300 having the picker arm 1310 shown in FIG. 18 on its one side does not perform an operation of causing the data cartridges 1320 to get caught by using two picker arms and, therefore, it is not necessary for the picker mechanism 1300 to have such a complicated mechanism as the picker mechanism 1200 shown in FIG. 16 or the like, which, as a result, enables the picker mechanism 1300 to be miniaturized. However, in the picker mechanism 1300 shown in FIG. 18, in a position where the picker mechanism 1300 transfers and receives the data cartridges 1320, the picker arm 1310 must provide space for rotating the picker arm 1310, like a circular arc, about the shaft 1311, which still causes a problem in the miniaturization of the library device.

Moreover, as shown in FIG. 19, the picker mechanism 1400 having the picker arm 1401 on its one side that moves in a vertical direction is not suitable structurally for use in the library device being so configured as to house data cartridges 1410 up and down in multiple stages. The reason is that space required to insert the picker arm 1401 and rotate the same has to be provided among the data cartridges 1410 arranged up and down in multiples stages and, as a result, an efficiency of housing the data cartridges 1410 in the library device is low, thus causing the library device to be made large.

SUMMARY OF THE INVENTION

In view of the above, it is an object of the present invention to provide a picker mechanism and a library device having the same that can achieve its miniaturization. It is another object of the present invention to provide a picker mechanism and a library device having the same that can shorten time required to move data cartridges.

According to a first aspect of the present invention, there is provided a picker mechanism making up a library device having at least one drive device to read and write data from or onto storage media housed in a plurality of data cartridges and at least one magazine being provided with a plurality of cells each housing one of the plurality of the data cartridges, for loading and unloading each of the data cartridges on or from the at least one drive device and each of the cells, the picker mechanism including:

a swivel mechanism to rotate the picker mechanism on a supporting base used to support the picker mechanism;

a feeding section having a picker arm being attached on one side of the feeding section and being held in a fixed manner by a notch formed on a side of each of the data cartridges; and a feeding section driving mechanism to move the feeding section in a direction intersecting a direction of rotation of the picker mechanism made by the swivel mechanism.

By configuring above, operations of making the picker arm be held by the notch of the data cartridge in a fixed manner or be separated from the notch of the data cartridge can be performed, not by rotating the picker arm, but by moving the picker mechanism itself by using an accessor mechanism mounting the picker mechanism or rotating the picker mechanism by the swivel mechanism. As a result, it is not necessary that the picker mechanism is provided with a mechanism to open or close the picker arm and it is made possible to miniaturize the picker mechanism itself. Furthermore, it is not necessary that space is provided for rotating the picker arm between the cells adjacent to one another in the magazine and/or in a portion surrounding the drive device and, therefore, it is made possible for the magazine to be arranged with small intervals between the cells and for the data cartridge to be mounted in high density, which enables the drive device to be arranged in high density, thus achieving miniaturization of the library device having the picker mechanism.

Additionally, by configuring as above, for example, operations of transferring the data cartridge from one cell to another cell in the magazines facing one another can be performed by reversing the picker mechanism using the swivel mechanism after having unloaded the data cartridge from one cell using the picker mechanism and by loading the data cartridge on another cell from the picker mechanism and, as a result, time required for operations of transferring the data cartridge can be shortened more when compared with the conventional technology in which the data cartridge is transferred along the U-shaped path.

In the foregoing, a preferable mode is one wherein the picker arm in the feeding section is mounted on a side facing a direction of rotation of the picker mechanism made by the swivel mechanism.

Also, a preferable mode is one wherein the swivel mechanism is so configured as to rotate the picker mechanism about an approximately central portion of the picker mechanism and wherein the feeding section driving mechanism is so configured as to move the feeding section in a radius direction of a rotation circle formed by the picker mechanism being made to rotate about the approximately central portion of the picker mechanism by the swivel mechanism.

By configuring as above, it is possible that space required for rotation of the picker mechanism made by the swivel mechanism can be minimized and the library device having the picker mechanism can be made smaller.

According to a second aspect of the present invention, there is provided a library device including:

at least one drive device to read and write data from and onto storage media housed in a plurality of data cartridges;

at least one magazine having a plurality of cells each housing one of the plurality of the data cartridges, a picker mechanism to load and unload each of the data cartridges on or from the at least one drive device and each of the cells; and an accessor mechanism to mount the picker mechansim and to transfer the picker mechanism between the at least one drive device and each of the cells;

wherein the picker mechanism has a swivel mechanism to rotate the picker mechanism on the accessor mechanism, a feeding section having a picker arm being attached on one side of the feeding section and being held in a fixed manner by a notch formed on a side of each of the data cartridges, and a feeding section driving mechanism to move the feeding section in a straight line in a direction intersecting a direction of rotation of the picker mechanism made by the swivel mechanism.

In the foregoing, a preferable mode is one wherein the picker arm in the feeding section is mounted on a side facing a direction of rotation of the picker mechanism made by the swivel mechanism.

Also, a preferable mode is one wherein the swivel mechanism is so configured as to rotate the picker mechanism about an approximately central portion of the picker mechanism and wherein the feeding section driving mechanism is so configured as to move the feeding section in a radius direction of a rotation circle formed by the picker mechanism being made to rotate about the approximately central portion of the picker mechanism by the swivel mechanism.

By configuring above, operations of transferring the data cartridge from one cell to another cell in the magazines facing one another can be performed, not by rotating the picker arm, but by moving the picker mechanism itself using the accessor mechanism mounting the picker mechanism or by rotating the picker mechanism on the accessor mechanism using the swivel mechanism. As a result, it is not necessary that the picker mechanism is provided with a mechanism to open or close the picker arm and it is possible to miniaturize the picker mechanism itself. Furthermore, it is not necessary that space is provided for rotating the picker arm between the cells adjacent to one another in the magazine and/or in a portion surrounding the drive device and, therefore, it is made possible for the magazine to be arranged with small intervals between the cells and for the data cartridge to be mounted in high density, which enables the drive device to be arranged in high density, thus being able to achieve miniaturization of the library device having the picker mechanism.

Additionally, by configuring as above, for example, operations of transferring the data cartridge from one cell to another cell in the magazines facing one another can be performed by reversing the picker mechanism using the swivel mechanism after having unloaded the data cartridge from one cell using the picker mechanism and by loading the data cartridge on another cell from the picker mechanism and, as a result, time required for operations of transferring the data cartridge can be shortened more when compared with the conventional technology in which the data cartridge is transferred along the U-shaped path.

Also, a preferable mode is one wherein the library device is so configured as to unload the data cartridge housed in any one of cells or in the at least one drive device, by performing operations of moving the picker mechanism using the accessor mechanism to make the picker mechanism face the data cartridge being housed in the one of the cells or in the at least one drive device and of rotating the picker mechanism using the swivel mechanism to make an aperture of the picker mechanism face the data cartridge, by performing operations of moving the feeding section using the feeding section driving mechanism to make the picker arm be placed in a position facing the notch formed on a side of the data cartridge, by performing an operation of moving the accessor mechanism mounting the picker mechanism to make the picker arm be held in a fixed manner by the notch in the data cartridge, and by performing an operation of moving the feeding section using the feeding section driving mechanism to load the data cartridge on the picker mechanism.

Also, a preferable mode is one wherein the library device is so configured as to load the data cartridge into the cells, by performing operations of moving the picker mechanism with the data cartridge housed in an inside thereof, by using the accessor mechanism, with the picker arm being held in a fixed manner by the notch in the data cartridge, to make the picker mechanism be placed in a position facing the cells housing the data cartridge and of rotating the picker mechanism using the swivel mechanism to make an aperture of the picker mechanism face the cells, by performing an operation of moving the feeding section using the feeding section driving mechanism to load the data cartridge in the cells, and by performing an operation of moving the accessor mechanism mounting the picker mechanism to separate the picker arm from the notch in the data cartridge.

Also, a preferable mode is one wherein the library device is so configured as to unload the data cartridge being housed in the at least one drive device or any one of the cells, by performing operations of moving the picker mechanism using the accessor mechanism to make the picker mechanism be placed in a position facing the data cartridge being housed in the at least one drive device or the one of the cells and of rotating the picker mechanism using the swivel mechanism to make an aperture of the picker mechanism face the data cartridge, with the aperture of the picker mechanism being made slant in a direction of a side on which the picker arm in the feeding section is mounted, by performing an operation of moving the feeding section using the feeding section driving mechanism to make the picker arm be placed in a position facing the notch formed on a side of the data cartridge, by performing an operation of rotating the picker mechanism using the swivel mechanism to make the picker arm be held in a fixed manner by the notch in the data cartridge, and by performing an operation of moving the feeding section using the feeding section driving mechanism to load the data cartridge into the picker mechanism.

Furthermore, a preferable mode is one wherein the library device is so configured as to load the data cartridge into the at least one drive device by performing operations of moving the picker mechanism housing the data cartridge in an internal portion in the picker mechanism using the accessor mechanism, with the picker arm being held in a fixed manner by the notch in the data cartridge, to make the picker mechanism be placed in a position facing the at least one drive device housing the data cartridge and of rotating the picker mechanism using the swivel mechanism to make an aperture of the picker mechanism directly face the at least one drive device, by performing an operation of moving the feeding section using the feeding section driving mechanism to insert the data cartridge to a first position in the at least one drive device, by performing an operation of rotating the picker mechanism using the swivel mechanism to separate the picker arm from the notch in the data cartridge, by performing an operation of moving the feeding section using the feeding section driving mechanism to draw the feeding section into the picker mechanism, and by performing an operation of moving the picker mechanism using the accessor mechanism to make a cartridge pushing-in section being mounted in an aperture of the accessor mechanism be placed in a position facing the data cartridge, and by performing an operation of moving the picker mechanism using the accessor mechanism to insert the data cartridge to a second position in the at least one drive device, so that the cartridge pushing-in section pushes the data cartridge into the at least one drive device.

By configuring as above, in a case where the drive device are provided with an automatic loading mechanism which automatically loads the data cartridge, after the data cartridge has been inserted to its second position and thereafter, when the data cartridge is fully inserted to its second position by moving the feeding section using the feeding driving mechanism, since the data cartridge to be drawn in the drive device by the automatic loading mechanism that has started its operation is pulled by the picker arm, there is a fear that a failure occurs in the picker arm or the automatic loading mechanism. Therefore, by moving the feeding section using the feeding section driving mechanism to remove the picker arm from the notch in the data cartridge after having inserted the data cartridge to the first position in the drive device and then by moving the picker mechanism using the accessor mechanism and by pushing the data cartridge using the cartridge pushing-in section into the picker mechanism to insert the data cartridge to the second position, the data cartridge can be smoothly inserted into the drive device having the automatic loading mechanism.

With the above configuration, the picker mechanism is provided with the swivel mechanism to rotate the picker mechanism on a supporting base used to support the picker mechanism, with the feeding section having the picker arm being attached on one side of the feeding section and being held in a fixed manner in the notch formed on a side of each of the data cartridges, and with the feeding section driving mechanism to move the feeding section in a straight line in a direction intersecting a direction of rotation of the picker mechanism made by the swivel mechanism and, therefore, it is not necessary that the picker mechanism has a mechanism to open and close the picker arm and it is possible to miniaturize the picker mechanism itself and it is also not necessary that space for rotating the picker arm is provided between the cells being adjacent to one another in the magazine, thus enabling intervals between the cells to be made narrow and the data cartridge to be housed in high density and miniaturization of the library device to be achieved.

With another configuration as above, operations of transferring the data cartridge from one cell to another cell in magazines facing one another can be performed by reversing the picker mechanism using the swivel mechanism after having unloaded the data cartridge from one cell using the picker mechanism and by loading the data cartridge on another cell from the picker mechanism and, as a result, time required for operations of transferring the data cartridge can be shortened more when compared with the conventional technology in which the data cartridge is transferred along the U-shaped path.

BRIEF DESCRIPTION OF THE DRAWINGS

The above and other objects, advantages, and features of the present invention will be more apparent from the following description taken in conjunction with the accompanying drawings in which:

FIGS. 11A to 11E are diagrams for explaining operations of housing a data cartridge into the cell according to the embodiment of the present invention;

FIGS. 12A to 12E are diagrams for explaining operations of unloading a data cartridge from a drive device according to the embodiment of the present invention;

FIGS. 13A to 13E are diagrams for explaining operations of loading a data cartridge into the drive device according to the embodiment of the present invention;

FIGS. 14F to 14I are also diagrams for explaining operations of loading a data cartridge into the drive device according to the embodiment of the present invention;

DETAILED DESCRIPTION OF THE PREFERRED EMBODIMENTS

Best modes of carrying out the present invention will be described in further detail using various embodiments with reference to the accompanying drawings.

Figure 1:
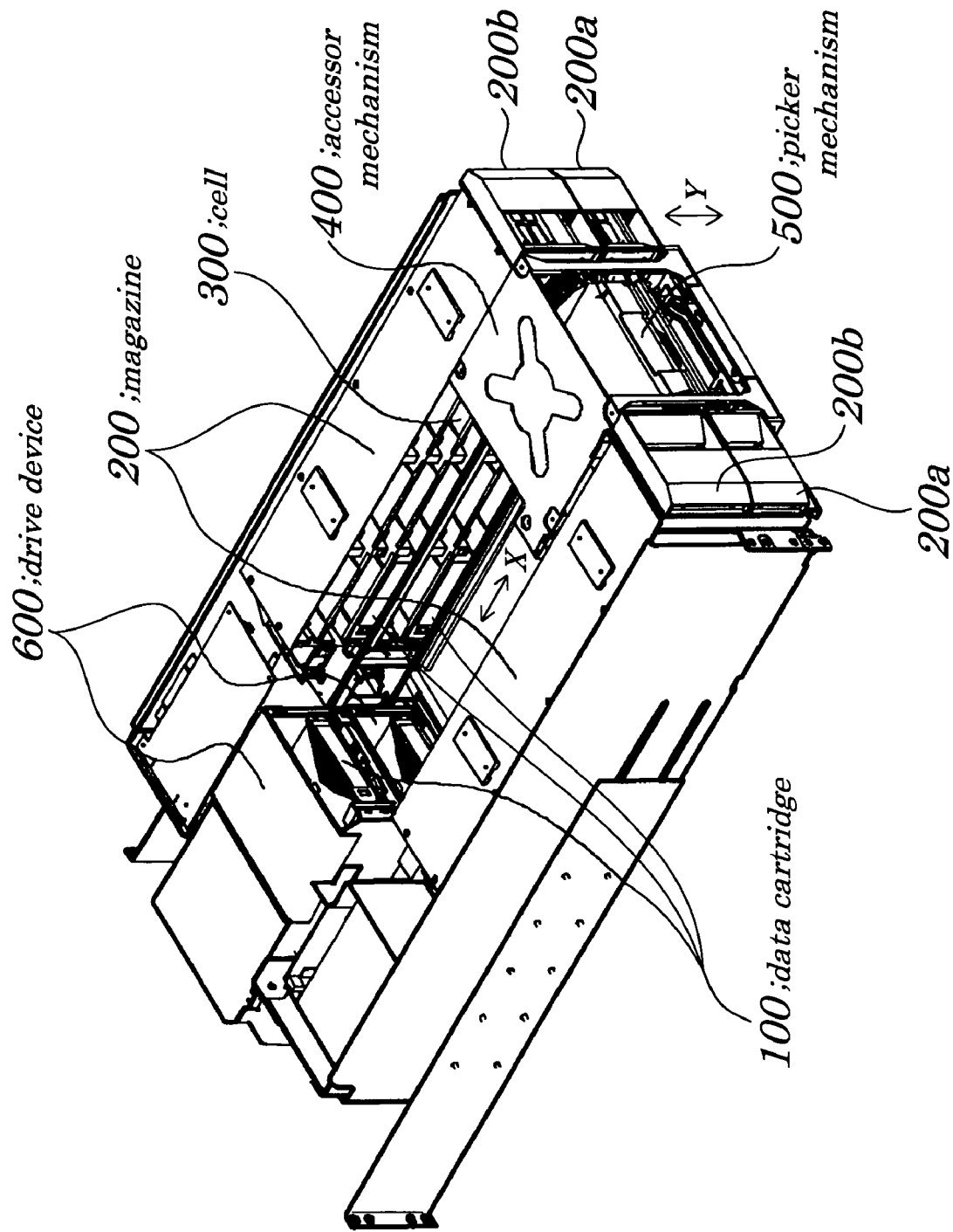
FIG. 1 is a perspective view schematically illustrating configurations of a library device according to an embodiment of the present invention.

FIG. 1 is a perspective view schematically illustrating configurations of a library device according to an embodiment of the present invention. As shown in FIG. 1, the library device of the embodiment includes magazines 200 each having a plurality of cells 300 which houses data cartridges 100 being stacked in a horizontal manner, two drive devices 600 each reading and writing data from and on storage media in the data cartridges 100, and an accessor mechanism 400 to transfer the data cartridges 100.

In the embodiment, the two magazines 200 are arranged in a manner in which aperture (opening) portions of the cells 300 in one magazine 200 face aperture portions of the cells 300 in another magazine 200 and, further, the two stacked drive devices 600 are placed in the vicinity of one end of each of the two magazines 200, and the magazines 200 and drive devices 600 are arranged in a manner to be approximately U-shaped. The accessor mechanism 400 has a lifter mechanism 410 (see FIG. 3) used to move a picker mechanism 500 to load and unload the data cartridges 100 between the cells 300 and drive devices 600 in a Y direction shown in FIG. 3 and a linear mechanism 450 (see FIG. 3) used to move the lifter mechanism 410 in an X direction shown in FIG. 3. The lifter mechanism 410 (see FIG. 3 or a like) in the accessor mechanism 400 moves in the X direction between the two magazines 200 facing one another.

Each of the magazines 200 is made up of a magazine 200*a* and a magazine 200*b* in which the magazine 200*b* having a total of twelve pieces (4 columns×3 stages) of the cells 300 overlies the magazine 200*a* having a total of eight pieces (4 columns×2 stages) of the cells 300. That is, in the embodiment, each of the magazines 200 has a total of twenty pieces of the cells 300 and, therefore, the two magazines 200 can house a total of forty pieces of the data cartridges 100. A lowest end of a rib (partition wall, not shown) mounted in the magazines 200 to partition a plurality of the cells 300 in a column direction is a distance away from a bottom plate of the cells 300 and clearance is created between the lowest end of the rib and the bottom plate of the cells 300 accordingly. This clearance enables a picker arm 521 (see FIG. 7) to access a notch 110 (see FIG. 2) formed in the data cartridge 100.

Moreover, any number of cells 300 held by the magazines 200 and any number of the stages of magazines 200 can be acceptable in the present invention. The accessor mechanism 400 may be so configured that a distance of the movement in the X and Y directions can be changed appropriately according to the number of cells 300 held by the magazines 200 and the number of stages of the magazines 200.

Figure 2:
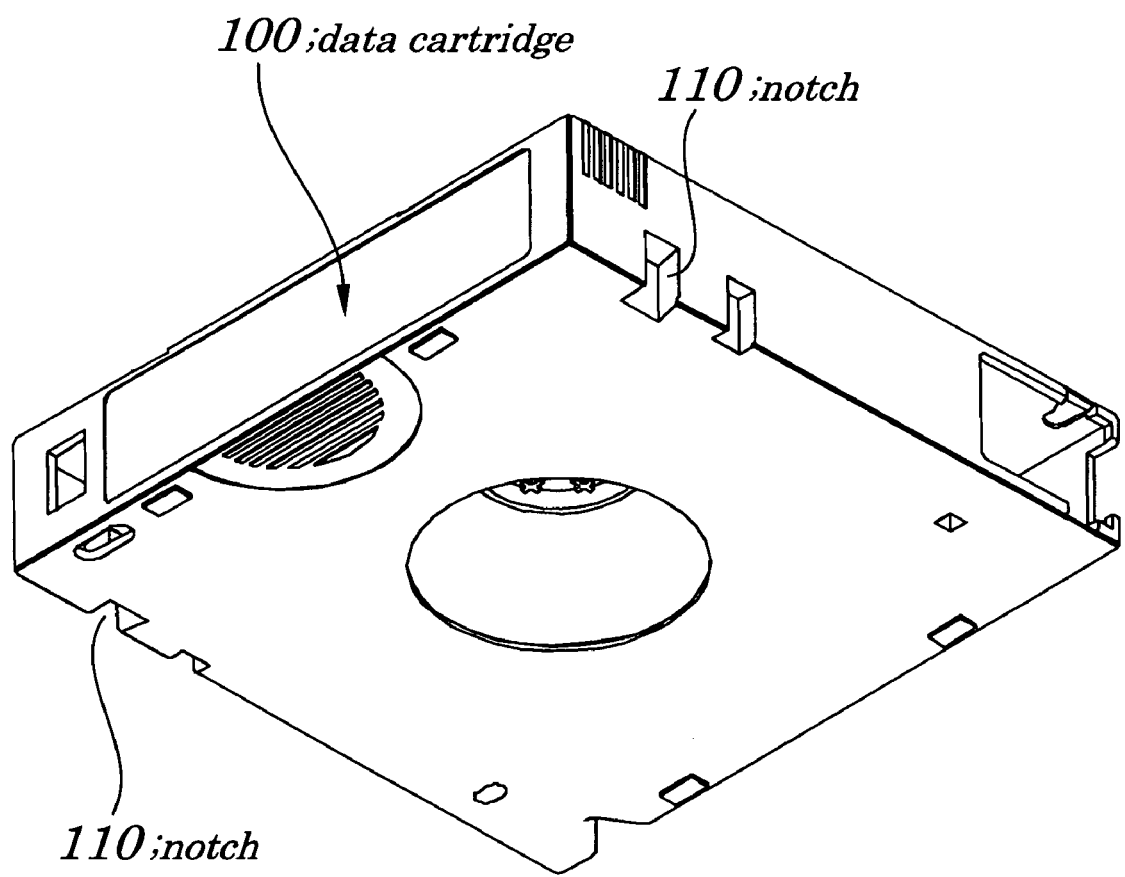
FIG. 2 is a perspective view showing one example of a data cartridge according to the embodiment of the present invention.

The data cartridge 100 is a storage medium to read and write data shared by computers (not shown) being connected to the library device via communication lines to be used in such a LAN (Local Area Network), the Internet, or a like. Such the storage medium includes, for example, tape media such as an LTO (Linear Tape-Open), DLT (Digital Linear Tape) or a like, a DVD (Digital Versatile Disc) being placed in each housing, an MO (Magneto-Optical disk), disk media such as an MD (Mini Disk), or a like. FIG. 2 shows a data cartridge 100 having an LTO tape cartridge shape on both sides of which the notches 110 are formed.

The drive device 600 is a read/write device which reads data written in the data cartridge 100 mounted in the drive device 600 and writes data renewed by an operator of a computer onto the data cartridge 100. In the embodiment, though one drive device 600 overlies another drive device 600, any number of drive devices 600 that the library device has may be mounted.

The picker mechanism 500 mounted in the accessor mechanism 400 performs operations of holding data cartridges 100 to load or unload the data cartridges 100 on or from the cells 300 in the magazines 200 and the drive device 600 and of changing a direction of the data cartridge 100 with its horizontal position being kept. The accessor mechanism 400 having the picker mechanism 500, by performing such operations, can transfer data cartridges 100 between the cells 300 and drive devices 600, among the cells 300, and among the drive devices 600.

Figure 3:
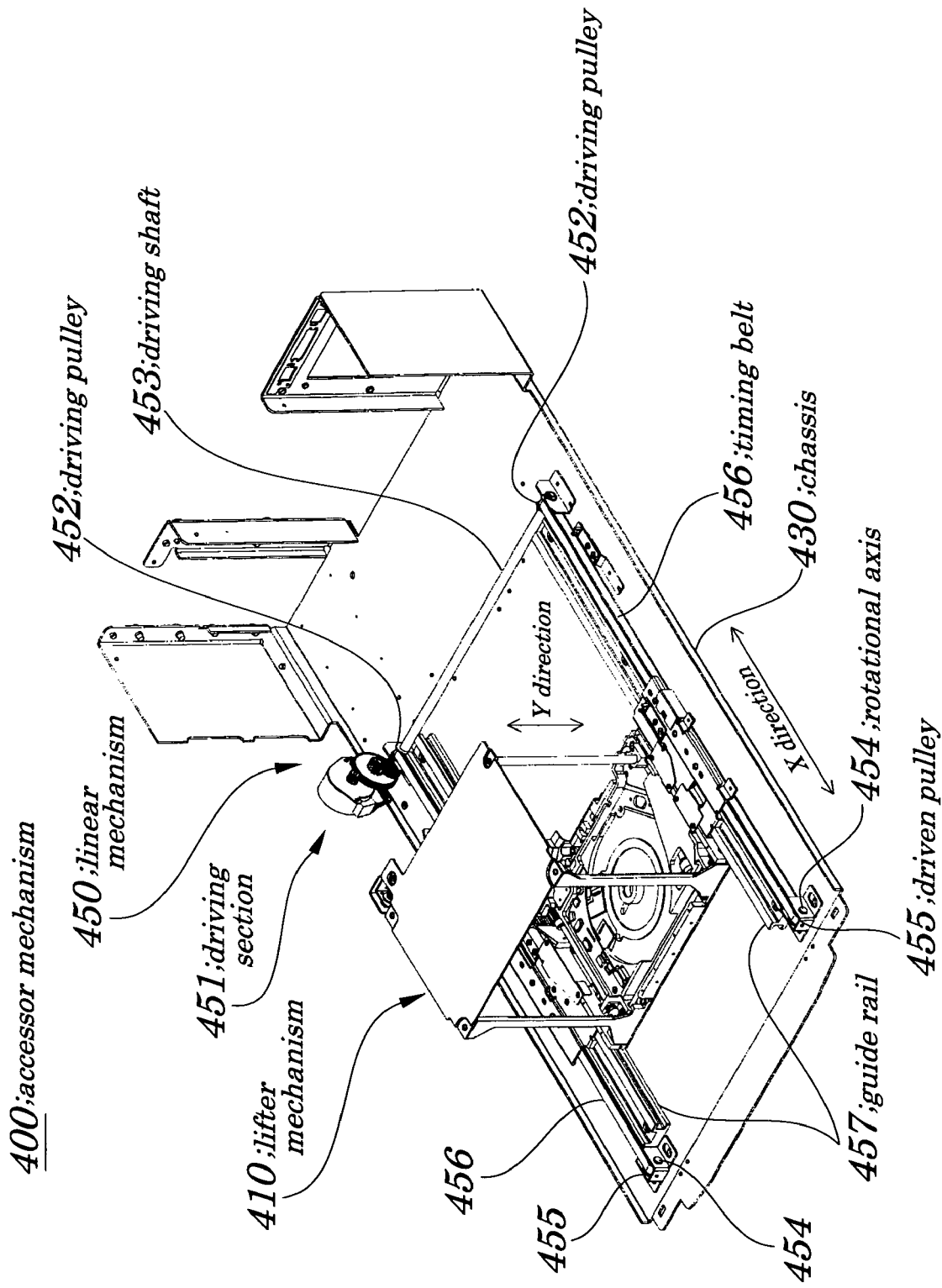
FIG. 3 is a perspective view showing detailed configurations of the accessor mechanism 400 shown in FIG. 1.

FIG. 3 is a perspective view for showing detailed configurations of the accessor mechanism 400 shown in FIG. 1. Moreover, in FIG. 3, for convenience of illustration, the picker mechanism 500 shown in FIG. 1 is omitted.

As shown in FIG. 3, the accessor mechanism 400 includes a picker mechanism 500 (not shown) to load and unload data cartridges 100 between the cells 300 and drive devices 600, the lifter mechanism 410 to hoist and lower the data cartridges 100 in an up and down direction (Y direction shown in FIG. 3), and the linear mechanism 450 to move the lifter mechanism 410 in a horizontal direction (X direction shown in FIG. 3). The lifter mechanism 410 and linear mechanism 450 are mounted in a chassis 430 in the library device.

The linear mechanism 450 includes a driving section 451 made up of a motor and a driving gear string (combined driving gears), a driving shaft 453 having a pair of driving pulleys 452 in the vicinity of its both side portions and being made to rotate to be driven by the driving section 451, a pair of driven pulleys 455 each being able to rotate about the rotational axis 454, a pair of timing belts 456 each being wound round the driving pulley 452 and the driven pulley 455, and two guide rails 457 to guide the lifter mechanism 410 in the X direction shown in FIG. 3. A fixing portion of the lifter mechanism 410 is attached to a part of each of the timing belts 456.

In the linear mechanism 450 having such configurations as above, when a motor of the driving section 451 is driven and rotated in a normal or reverse direction, the driving shaft 453 is rotated by its driving power and the timing belts 456 each rotate in driven manner between the driving pulley 452 and the driven pulley 455. The lifter mechanism 410 being fixed partially to each of the timing belts 456 moves along the two guide rails 457 in the X direction shown in FIG. 3.

Figure 4:
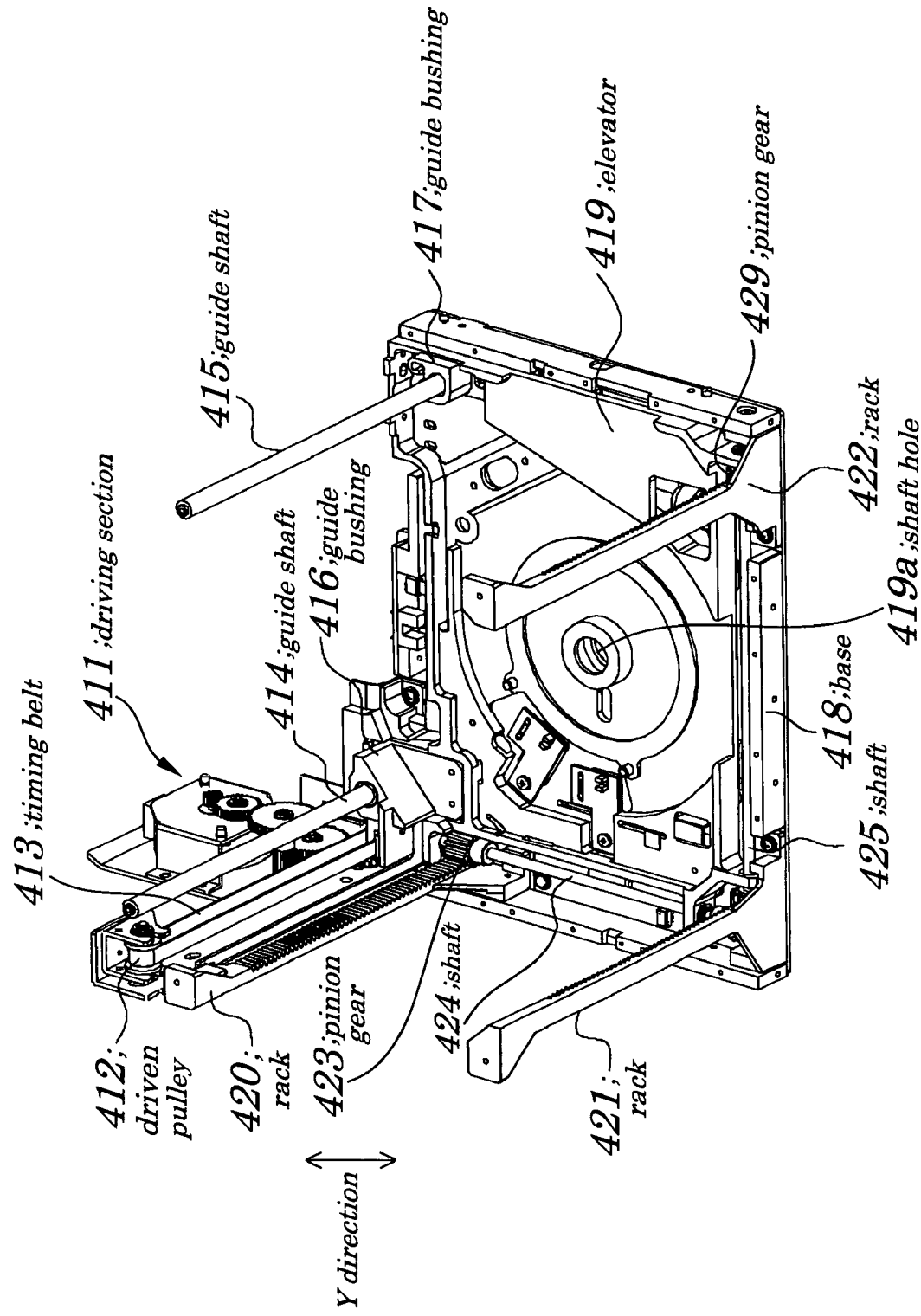
FIG. 4 is a diagram explaining configurations of a lifter mechanism shown in FIG. 3.
Figure 5:
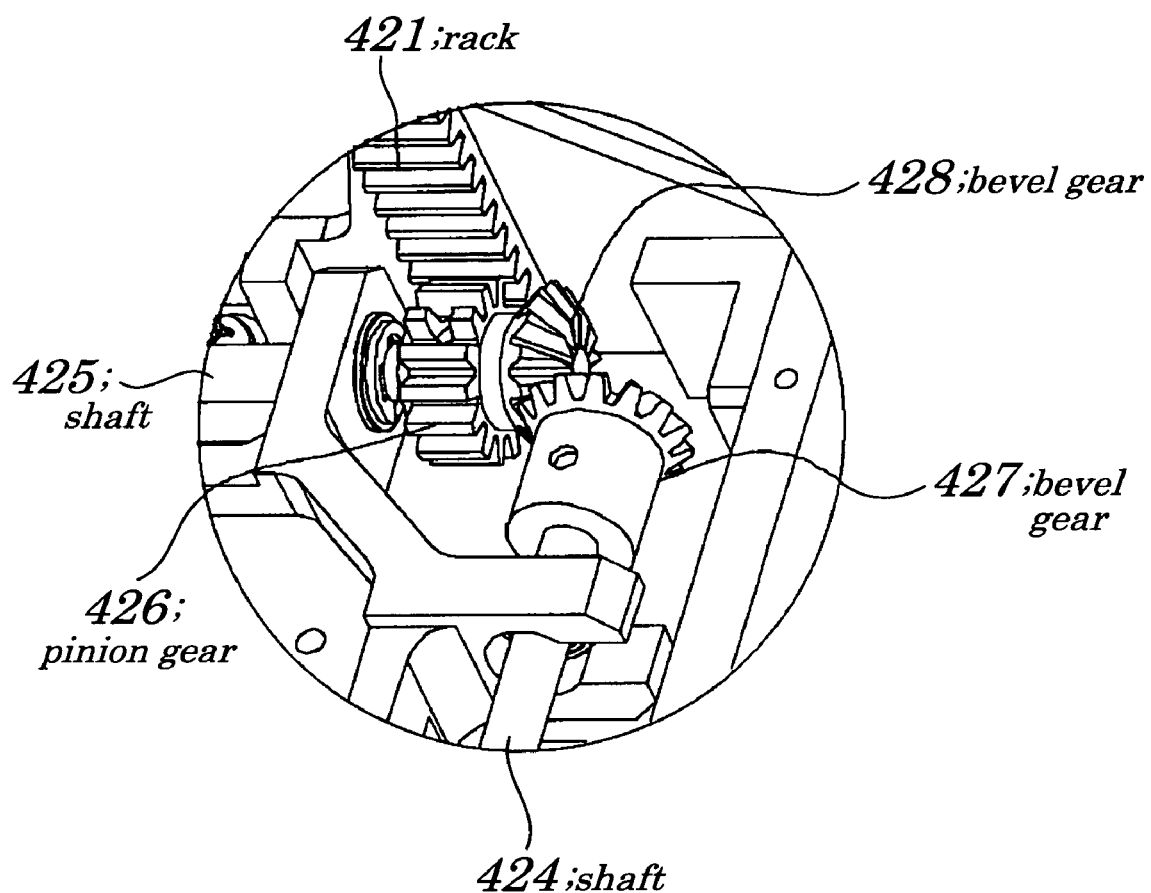
FIG. 5 is also a diagram explaining configurations of the lifter mechanism shown in FIG. 3.
Figure 6:
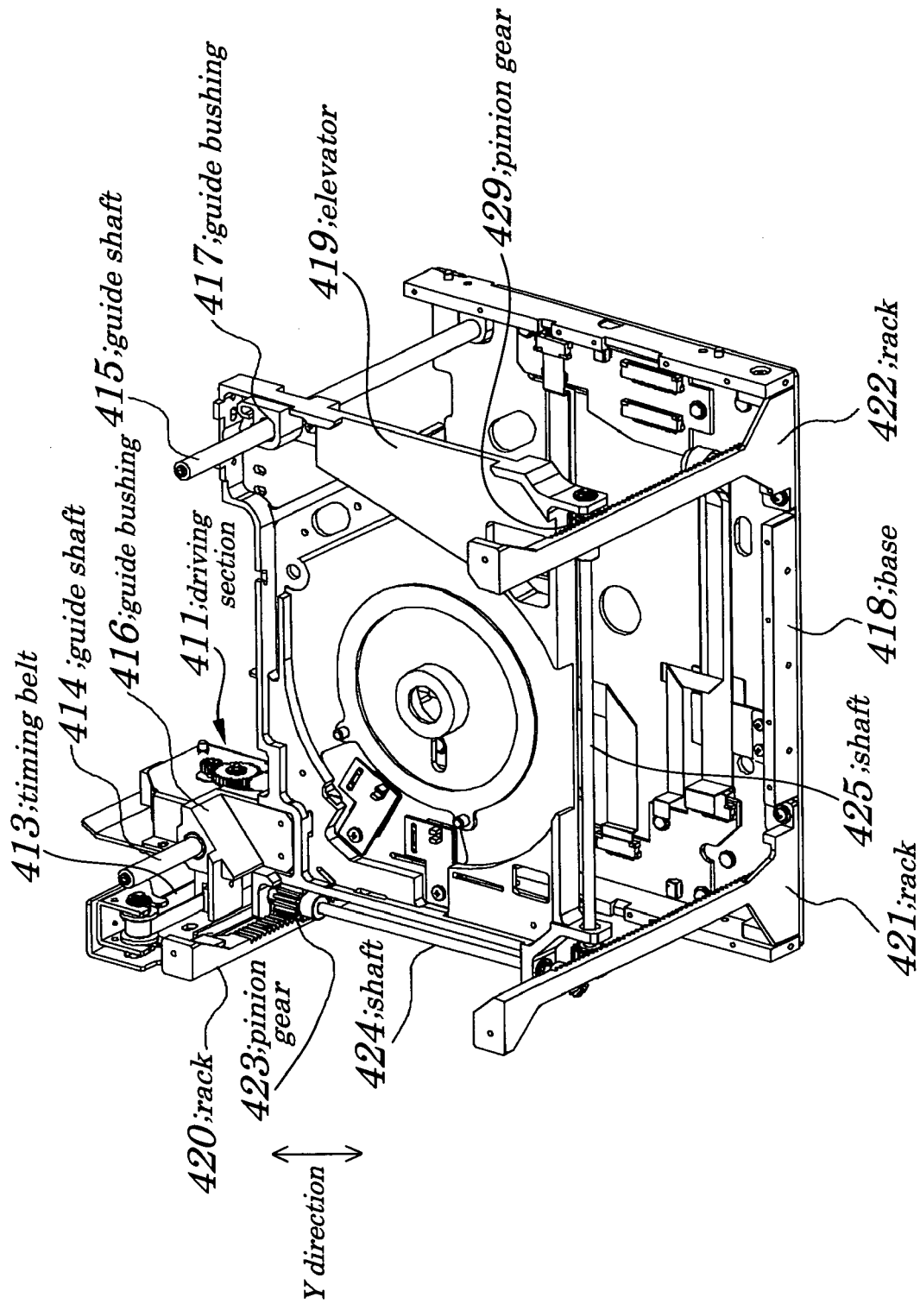
FIG. 6 is also a diagram explaining configurations of the lifter mechanism shown in FIG. 3.

Next, configurations of the lifter mechanism 410 are described by referring to FIGS. 4 to 6. For convenience of illustration, in FIGS. 4 to 6, explanation of a ceiling of the lifter mechanism 410 is omitted.

As shown in FIG. 4, the lifter mechanism 410 has racks 420, 421, and 422 mounted in three corners out of four corners on a base 418, a guide shaft 415 mounted in one corner out of four corners on the base 418, the base 418 having a guide shaft 414 mounted in the vicinity of the rack 420, and an elevator 419 being movable in a Y direction shown in FIG. 4 with reference to the base 418. The elevator 419 plays a role as a supporting base to support the picker mechanism 500. The elevator 419 has guide bushings 416 and 417 which slide along the guide shafts 414 and 415. The picker mechanism 500 is mounted on the elevator 419.

As shown in FIG. 4, the base 418 includes a driving section 411 made up of a motor and driving gear string ((combined driving gears) and a timing belt 413 being wound round a driving pulley (not shown) being made to rotate and to be driven by the driving section 411 and a driven pulley 412 being mounted so as to be rotational in an upward position of the driving pulley. An end portion of the guide bushing 416 is fixed partially on the timing belt 413.

The elevator 419 moves up and down by rotation of a shaft 424 having a pinion gear 423 engaging with the rack 420 on one end of the shaft 424 in a manner in which the shaft 424 can rotate and by rotation of a shaft 425 having a pinion gear 426 (FIG. 5) engaging with the rack 421 and a pinion gear 429 engaging with the rack 422 on both ends of the shaft 425 in a manner in which the shaft 425 can rotate. The elevator 419 is supported by the shafts 424 and 425. As shown in FIG. 5 in an enlarged form, two shafts 424 and 425 are connected to each other so as to form an angle of about 90° via bevel gears 427 and 428 mounted on ends of the shafts 424 and 425, respectively.

In the lifter mechanism 410 so configured as described above, when a motor (not shown) of the driving section 411 is made to rotate in a normal or reverse direction to be driven, a driving pulley (not shown) rotates by its driving force and the timing belt 413 rotates in a driven manner. Then, as shown in FIG. 6, the elevator 419 being fixed via the guide bushing 416 on a part of the timing belt 413 moves along the two guide shafts 414 and 415 in a Y direction as shown in FIG. 6. At this time point, the pinion gear 423 of the shaft 424 and pinion gears 426 and 429 of the shaft 425 move on the racks 420, 421, and 422 in a rolling manner. The elevator 419, since it has the shafts 424 and 425, pinion gears 423, 426, and 429, and bevel gears 427 and 428 being constructed as above, can move to the Y direction as shown in FIG. 6, with its posture being kept in parallel to the base 418.

Figure 7:
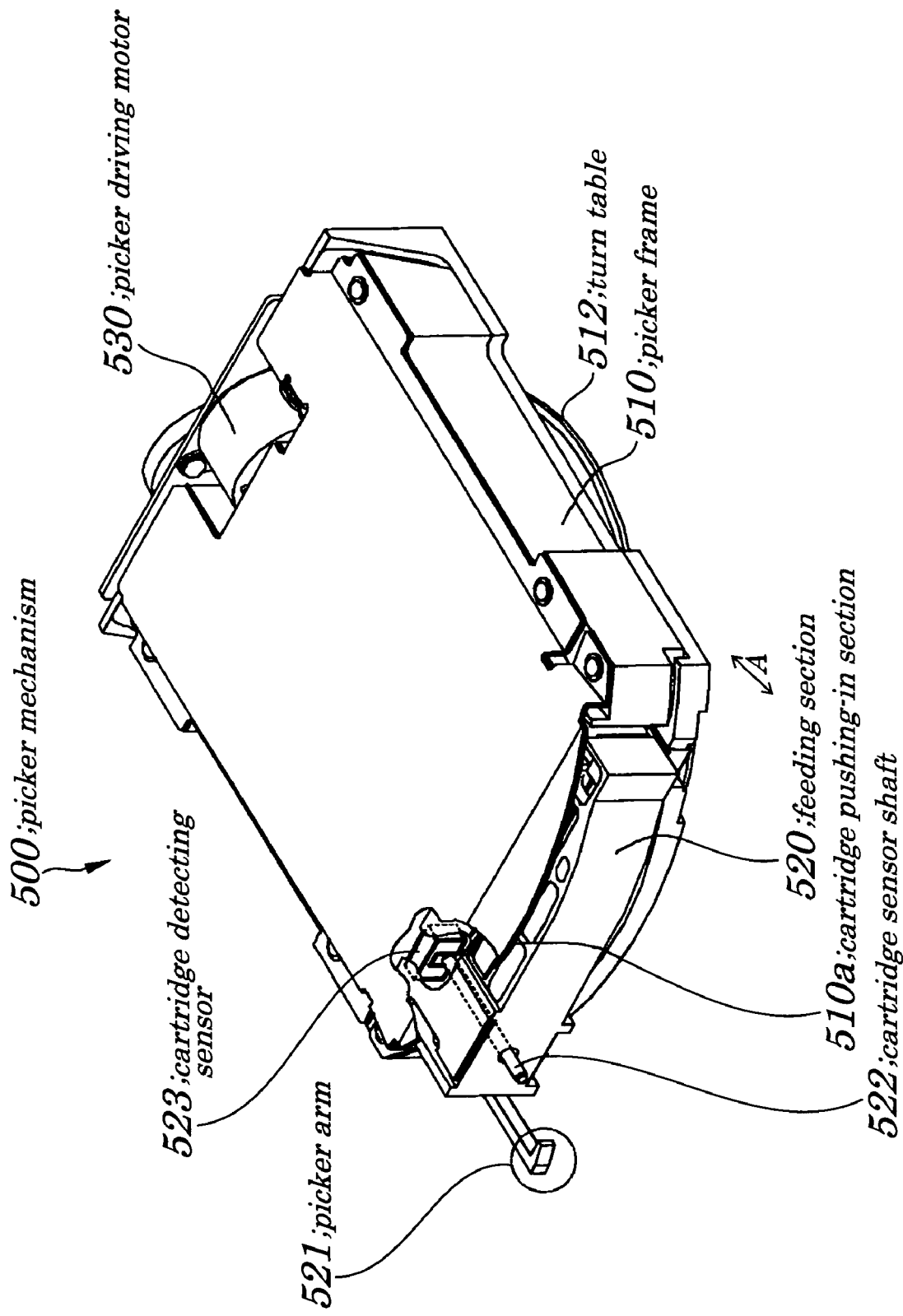
FIG. 7 is a perspective view, having a partially cutaway portion, explaining configurations of the picker mechanism shown in FIG. 1.
Figure 8:
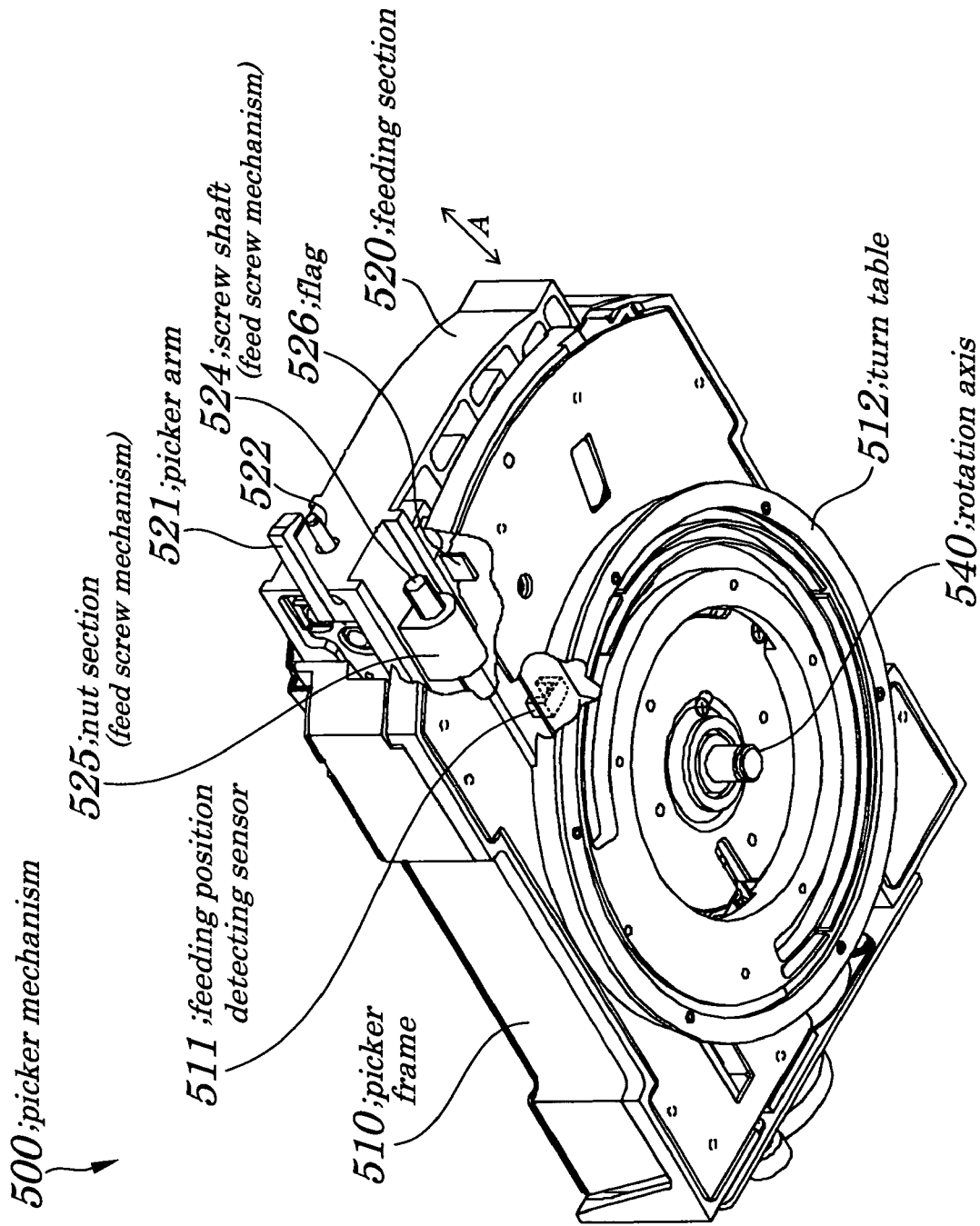
FIG. 8 is also a perspective view, having a partially cutaway portion, explaining configurations of the picker mechanism shown in FIG. 1.

Next, the picker mechanism 500 is described. FIGS. 7 and 8 each are a perspective view, having a partially cutaway portion, illustrating the picker mechanism 500 shown in FIG. 1.

As shown in FIG. 7, the picker mechanism 500 includes a picker frame 510 having a turntable 512 on its lower face and a feeding section 520 housed in the picker frame 510 and being movable to an "A" direction shown in FIG. 7. A canopy-like cartridge pushing-in section 510a is provided in the vicinity of an aperture (opening) that houses the feeding section 520 in the picker frame 510.

The feeding section 520 is provided with a picker arm 521 having a hook (not shown) used to be latched to a notch 110 (see FIG. 2) of the data cartridge 100 on its one side. Also, the feeding section 520 has a cartridge sensor shaft 522 that ordinarily extrudes from a top end face of the feeding section 520 as shown in FIG. 7 and a cartridge detecting sensor 523 to detect the presence of a rear end of the cartridge sensor shaft 522. The cartridge detecting sensor 523 does not detect the presence of the rear end of the cartridge sensor shaft 522 when the cartridge sensor shaft 522 extrudes from atop end face of the feeding section 520 as shown in the same figure. The cartridge sensor shaft 522, when the feeding section 520 comes into contact with the data cartridge 100 (see FIG. 2), is pushed into the feeding section 520. At this time point, the cartridge detecting sensor 523 detects the presence of the rear end of the cartridge sensor shaft 522. The cartridge detecting sensor 523, thus by detecting the presence of the rear end of the cartridge sensor shaft 522, detects whether or not the feeding section 520 is in contact with the data cartridge 100.

As shown in FIG. 8, a nut section 525 on an inner radius face of which a female screw is formed and a flag 526 used to detect a feeding position of the feeding section 520 are provided on a lower face side of the feeding section 520. On the other hand, within the picker frame 510 are mounted a screw shaft 524 made to rotate to be driven by a picker driving motor 530 (see FIG. 7) and a feeding position detecting sensor 511 to detect the presence of the flag 526 in the feeding section 520. Furthermore, in a center of the turn table 512 attached to a lower face of the picker frame 510 is mounted a rotation axis 540 to rotate the picker mechanism 500 in the lifter mechanism 410 (see FIG. 4).

The screw shaft 524 and nut section 525 make up a feed screw mechanism (feeding section driving mechanism) which moves the feeding section 520 in an "A" direction shown in FIG. 8 relative to the picker frame 510. The screw shaft 524 is made to rotate and to be driven by the picker driving motor 530 in the picker frame 510 in a normal or reverse direction. The nut section 525 moves in synchronization with rotation of the screw shaft 524 along the screw shaft 524 in the "A" direction shown in FIG. 8. The feeding section 520 can be made to move by the feed screw mechanisms (the screw shaft 524 and the nut section 525) in the "A" direction shown in FIG. 8 relative to the picker frame 510.

Moreover, the feeding position detecting sensor 511, when the feeding section 520 is fully housed in the picker frame 510 (position obtained when the feeding section 520 is fully housed in the picker frame 510 is called a "home position") is so configured as to detect the presence of the flag 526. In the embodiment, the picker driving motor 530 is made up of a stepping motor. Therefore, a moving distance (feeding position) from the home position of the feeding section 520 can be managed based on the number of pulses input into the picker driving motor 530 to rotate the screw shaft 524.

Figure 9:
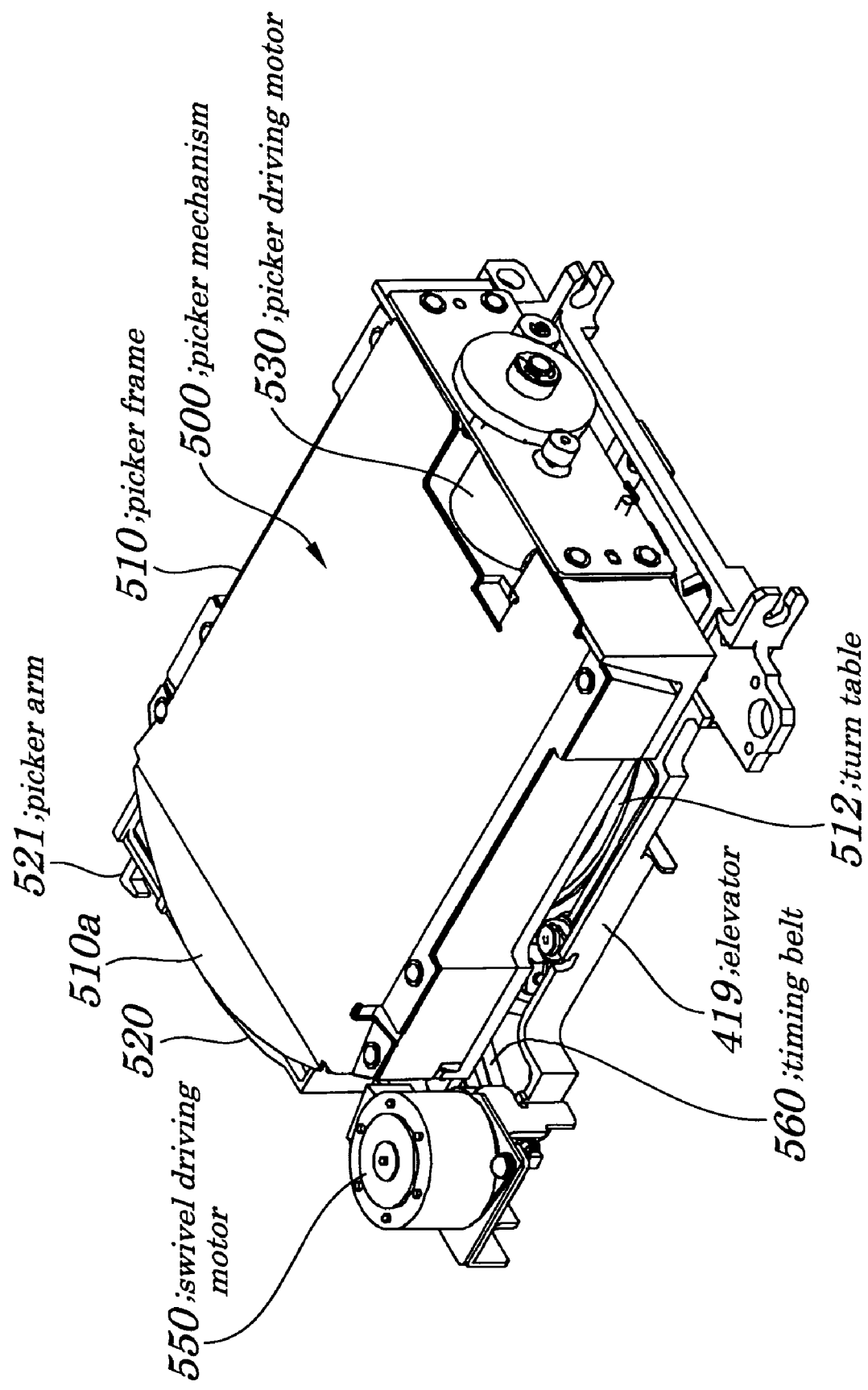
FIG. 9 is a perspective view explaining configurations of the picker mechanism shown in FIG. 1.

FIG. 9 is a perspective view showing a state in which the picker mechanism 500 is mounted on the elevator 419 in the lifter mechanism 410 shown in FIG. 7.

The picker mechanism 500 is mounted on the elevator 419 with the rotation axis 540 (see FIG. 8) being attached on a lower side of the picker mechanism 500 inserted in a shaft hole 419a (see FIG. 4) formed in the elevator 419. Thus, the picker mechanism 500 is supported on the elevator 419 in a manner to be freely rotated about the rotation axis 540. Moreover, though not shown in FIG. 4, the elevator 419 in the lifter mechanism 410 has a swivel driving motor 550 to rotate and drive the picker mechanism 500 by using the elevator 419. The swivel driving motor 550 makes up a swivel mechanism by being connected to the rotation axis 540 through a timing belt 560, in which, by rotating and driving the swivel driving motor 550 in a normal or reverse direction, it is made possible for the picker mechanism 500 to be rotated about the rotation axis 540 on the elevator 419 in a normal and reverse direction. As a result, the feeding section 520 described above is made to move in a direction intersecting a rotation direction of the picker mechanism 500 being made to rotate by the swivel driving motor 550 or the like. More specifically, the feeding section 520 is made to move in a radius direction of a rotating circle formed by the picker mechanism 500 made to rotate by the swivel driving motor 550 or the like.

Moreover, in the embodiment, the swivel driving motor 550 is made up of a stepping motor and an amount of rotation from a predetermined position of the picker mechanism 500 can be managed based on the number of pulses input in the swivel driving motor 550.

Next, various moving operations to be performed by the data cartridge 100 in the library device are described by referring to FIGS. 10 to 14.

(1) Operations of Unloading Data Cartridge from Cell

FIGS. 10A to 10D are diagrams for illustrating operations of unloading the data cartridge 100 being housed in the cell 300 in the magazine 200. FIGS. 10A to 10D each show only the elevator 419 out of components making up the accessor mechanism 400 and a state in which internal components making up the picker mechanism 500 are seen through.

Figure 10A:
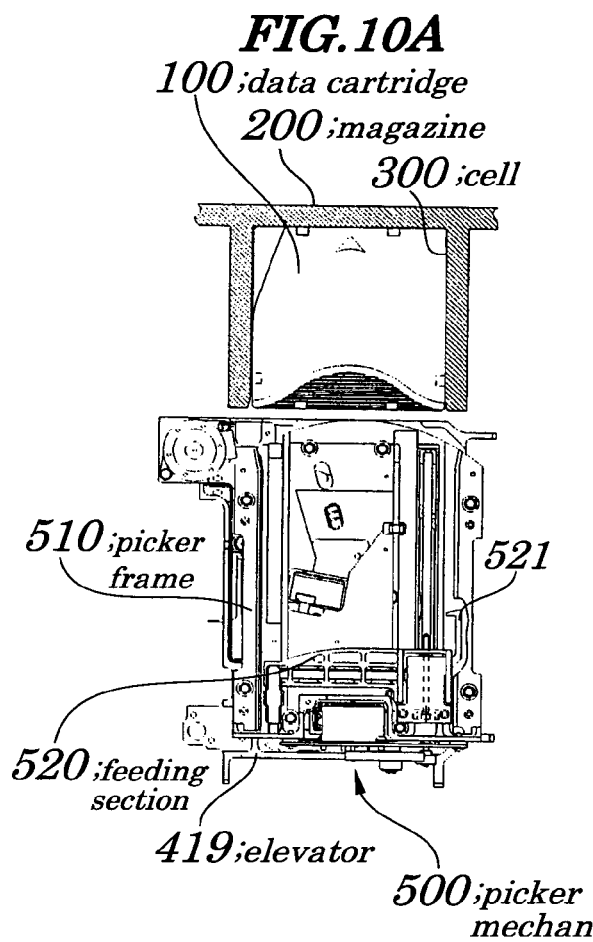
FIGS. 10A to 10D are diagrams for explaining operations of unloading a data cartridge from a cell according to the embodiment of the present invention.

When the data cartridge 100 is unloaded from the cell 300, as shown in FIG. 10A, first, the picker mechanism 500 is moved in the X and Y directions as shown in FIG. 3 or the like by using the accessor mechanism 400 and an aperture section of the picker frame 510 is so placed as to face the data cartridge 100 unloaded from the cell 300. At this time point, the feeding section 520 in the picker mechanism 500 is fully drawn into the picker frame 510 and the picker arm 521 is also housed in the picker frame 510.

Figure 10B:
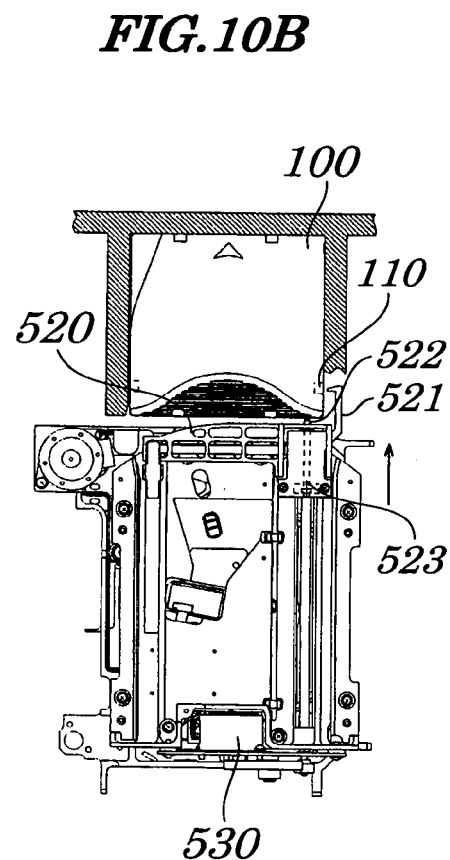

Next, as shown in FIG. 10B, the picker driving motor 530 in the picker mechanism 500 is driven to move the feeding section 520 until the cartridge sensor shaft 522 in the feeding section 520 directly contacts the data cartridge 100 and is pushed into the feeding section 520 and then a rear end of the data cartridge 100 is detected by the cartridge detecting sensor 523. At this time point, the picker arm 521 mounted in the feeding section 520 is inserted into a clearance formed on a lower side of a rib used to partition the cell 300 in the magazine 200 so that a hook of the picker arm 521 is placed so as to face the notch 110 in the data cartridge 100.

Figure 10C:
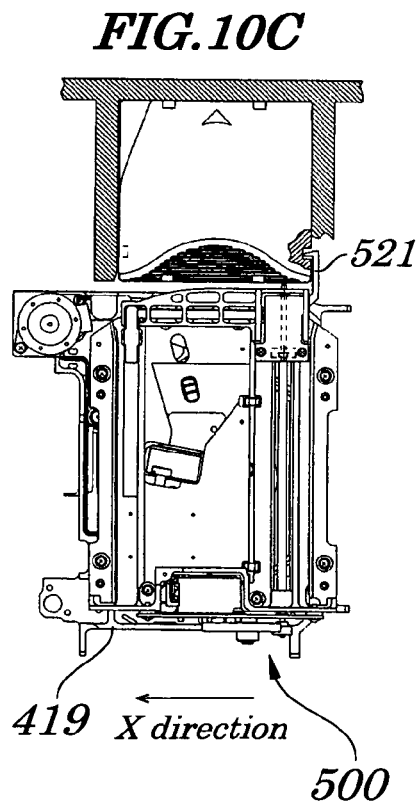

Next, with the picker mechanism 500 being kept in the state shown in FIG. 10B, as shown in FIG. 10C, the lifter mechanism 410, more specifically, the picker mechanism 500 placed on the lifter mechanism 410 is moved in the X direction shown in FIG. 10C by using the linear mechanism 450 in the accessor mechanism 400 until the hook of the picker arm 521 is made to be held in a fixed manner by the notch 110 in a fixed manner.

Figure 10D:
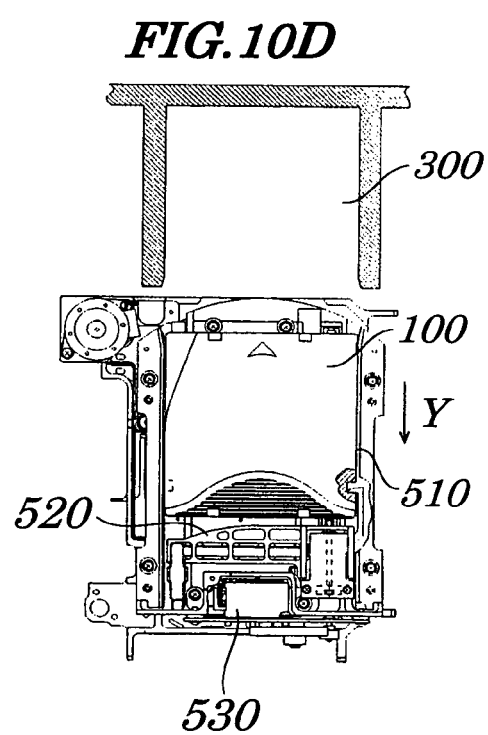
Figure 15:
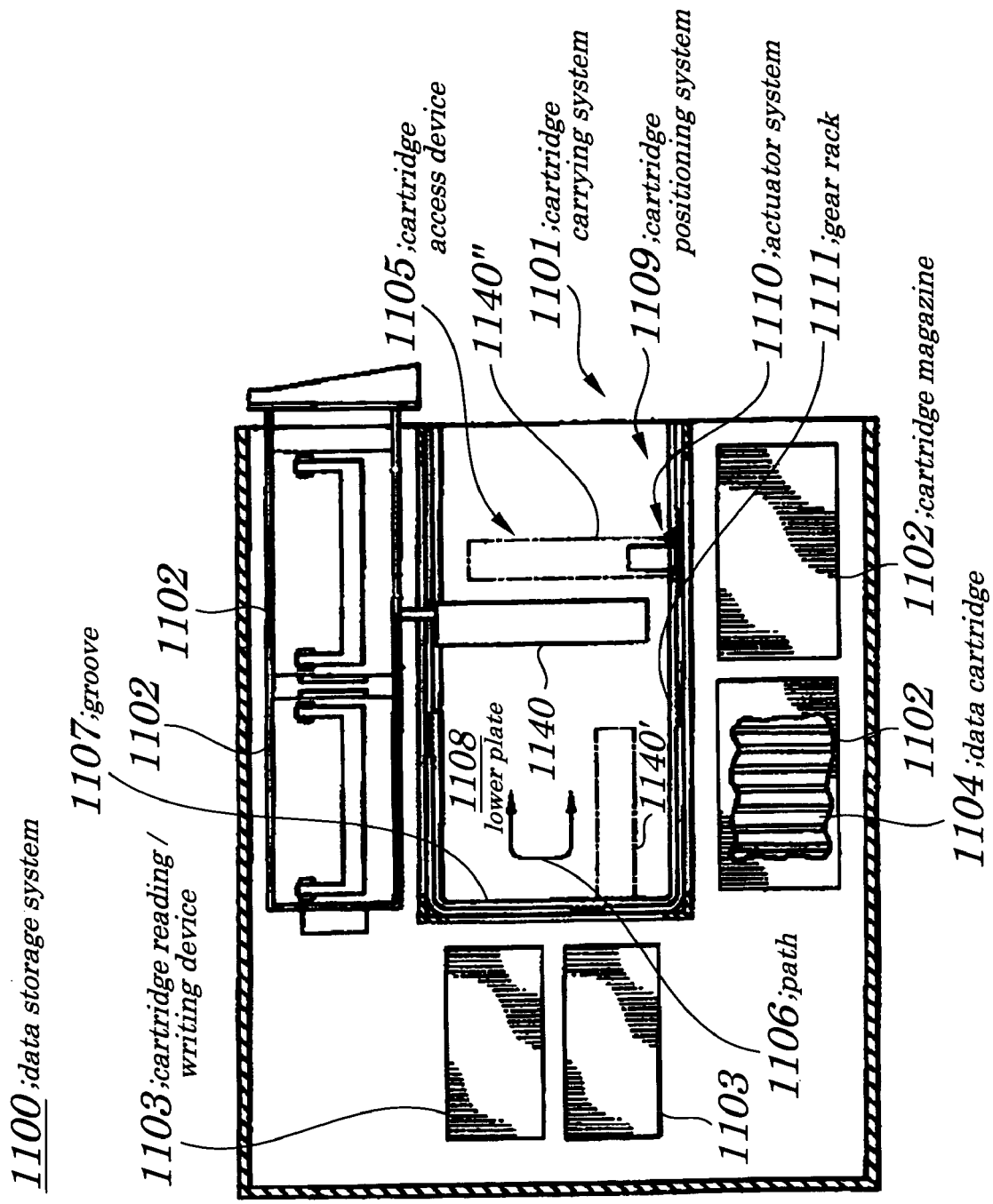
FIG. 15 is a plan view illustrating configurations of a conventional data storage system.
Figure 16:
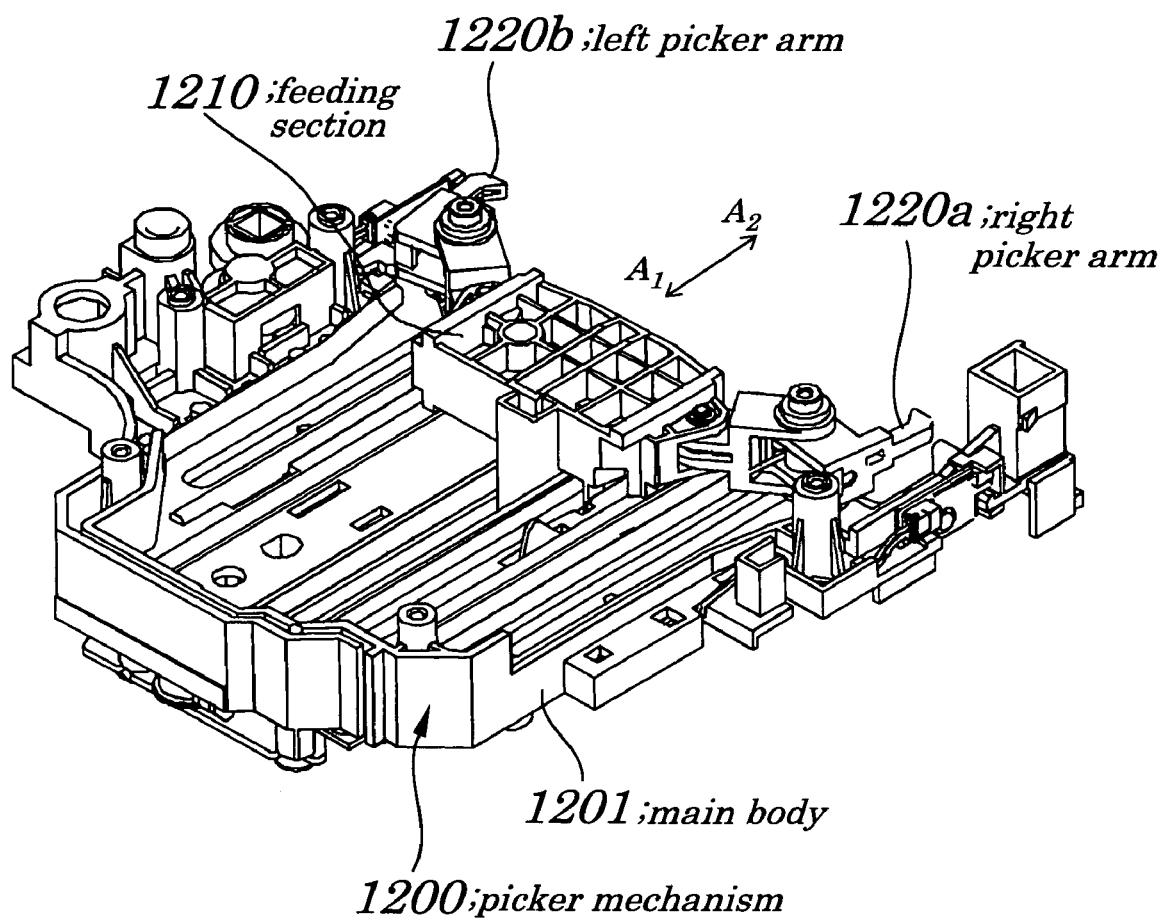
FIG. 16 is a perspective view showing one conventional example of a picker mechanism.
Figure 17:
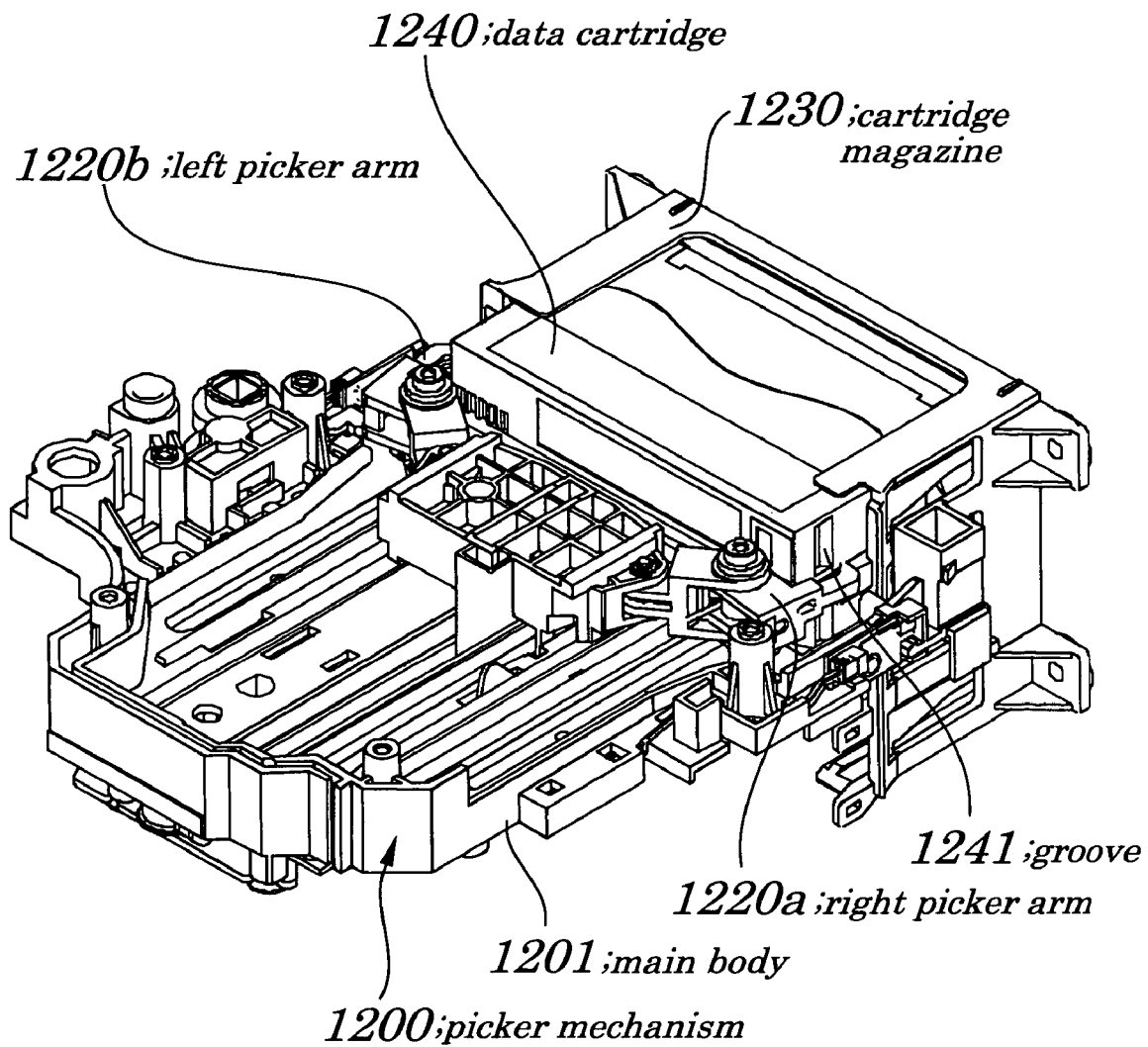
FIG. 17 is a perspective view illustrating a state in which the picker mechanism of FIG. 16 holds data cartridges.
Figure 18:
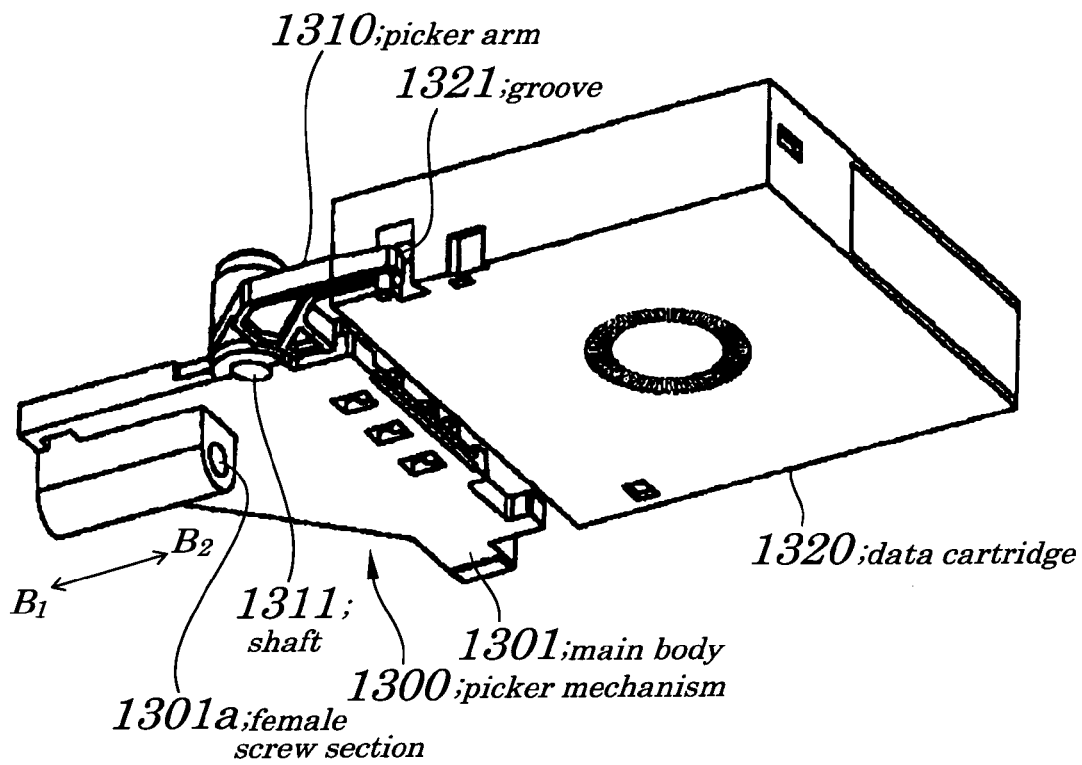
FIG. 18 is a perspective view illustrating configurations of another conventional picker mechanism.
Figure 19:
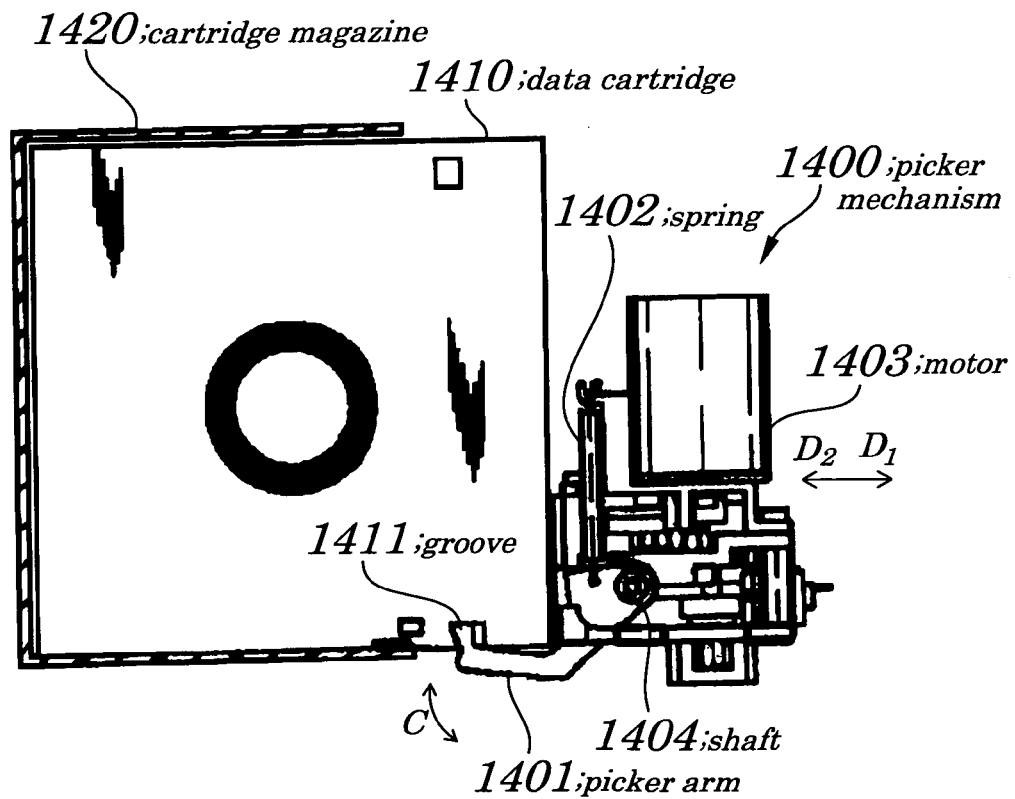
FIG. 19 is another perspective view for illustrating configurations of a still another conventional picker mechanism.

Finally, as shown in FIG. 10D, the picker driving motor 530 is driven to move the feeding section 520 to a position where the feeding section 520 is fully drawn into the picker frame 510. At this time point, the data cartridge 100 having been held by the picker arm 521 is drawn into the picker frame 510 together with the feeding section 520 and is then housed in the picker frame 510. Thus, operations of unloading the data cartridge 100 housed in the cell 300 in the magazine 200 are now completed.

As described above, the library device of the embodiment is so configured that the picker mechanism 500 grasps the data cartridge 100, not by rotating the picker arm 521 itself, but by moving each picker mechanism 500 by a length of the hook of the picker arm 521 in a direction in which the hook of the picker arm 521 is inserted into the notch 110 formed on a side of the data cartridge 100, after having inserted the picker arm 521 in a direction being in a parallel to the side of the data cartridge 100. Therefore, it is not necessary that the picker mechanism 500 is provided with a mechanism to open and close the picker arm 521, thus enabling the picker mechanism 500 itself to be made smaller in size. It is also not necessary that space for rotating the picker arm 521 is provided among cells 300 being adjacent to one another in the magazine 200, thus enabling intervals among the cells 300 to be made narrow and the data cartridge 100 to be housed in high density and miniaturization of the library device to be achieved. Moreover, operations of unloading the data cartridge 100 from the drive device 600 are the same as described above.

(2) Operations of Loading Data Cartridge into Cell

FIGS. 11A to 11E are diagrams showing operations of loading the data cartridge 100 into the cell 300 in the magazine 200. Moreover, FIG. 11 shows only the elevator 419 out of components making up the accessor mechanism 400 and a state in which internal components making up the picker mechanism 500 are seen through.

When the data cartridge 100 is to be housed in the cell 300, as shown in FIG. 11A, first, the picker mechanism 500 is moved in the X and Y directions as shown in FIG. 3 or the like by using the accessor mechanism 400 and an aperture section of the picker frame 510 is so placed as to face the cell 300 to be housed. At this time point, the feeding section 520 in the picker mechanism 500 has been drawn fully into the picker frame 510 and the data cartridge 100 has been housed in the picker frame 510 with the notch 110 of the data cartridge 100 being held by the picker arm 521.

Next, as shown in FIG. 11B, the picker driving motor 530 in the picker mechanism 500 is driven to move the feeding section 520 until the data cartridge 100 is housed in the cell 300.

Then, as shown in FIG. 1C, the picker driving motor 530 in the picker mechanism 500 is driven to rotate in a direction being reverse to the above and to slightly draw the feeding section 520 to a direction within the picker frame 510. This causes an end of the picker arm 521 having directly contacted the notch 110 in the data cartridge 100 to be separated from the notch 110.

Next, with the picker mechanism 500 being kept in the state shown in FIG. 11C, as shown in FIG. 1D, the lifter mechanism 410, that is, the picker mechanism 500 mounted on the lifter mechanism 410 is moved in the X direction shown in FIG. 11D until the hook of the picker arm 521 comes out of the notch 110 in the data cartridge 100, by using the linear mechanism 450 in the accessor mechanism 400.

Finally, as shown in FIG. 11E, the picker driving motor 530 is driven to move the feeding section 520 to a position where the picker frame 510 has been fully drawn. Thus, operations of housing the data cartridge 100 in the cell 300 in the magazine 200 are now completed.

Moreover, for example, between two magazines 200, 200 facing one another, a transfer of the data cartridge 100 from one of the cells 300 in one magazine 200 to another of the cells 300 in another magazine 200 can be achieved by unloading the data cartridge 100 from the above one cell 300 using the picker mechanism 500 and then by driving the swivel driving motor 550 to move and reverse the picker mechanism 500 while the picker mechanism 500 is moved using the accessor mechanism 400 and by housing the data cartridge 100 from the picker mechanism 500 to another cell 300 and, therefore, it is made possible to reduce time required to transfer the data cartridge when compared with the conventional technology in which the data cartridge is carried along the U-shaped path.

(3) Operations of Unloading Data Cartridge from Drive Device

FIGS. 12A to 12E are diagrams explaining operations of unloading the data cartridge 100 housed in the drive device 600 according to the embodiment of the present invention. FIGS. 12A to 12E each show only the elevator 419 out of components making up the accessor mechanism 400 and a state in which internal components making up the picker mechanism 500 are seen through.

Before the operations of unloading the data cartridge 100 from the drive device 600 are started, the lifter mechanism 410 on which the picker mechanism 500 is mounted has been placed in an arbitrary position as shown in FIG. 12A.

When operations of unloading the data cartridge 100 from the drive device 600 are started, as shown in FIG. 12B, the picker mechanism 500 is first moved using the accessor mechanism 400 in the X and Y directions shown in FIG. 3 or the like and the swivel driving motor 550 on the elevator 419 is driven to rotate the picker mechanism 500 so that an aperture portion of the picker frame 510 is placed in a position facing the data cartridge 100 to be unloaded from the drive device 600. At this time point, the aperture portion of the picker frame 510 does not face the data cartridge 100 directly but is placed slightly slant in a direction in which the picker arm 521 is mounted. Moreover, at this time point, the feeding section 520 of the picker mechanism 500 has been fully drawn in the picker frame 510.

Next, as shown in FIG. 12C, the picker driving motor 530 in the picker mechanism 500 is driven to move the feeding section 520 until the cartridge sensor shaft 522 in the feeding section 520 directly contacts the data cartridge 100 and is pushed into the feeding section 520 and the presence of a rear end of the data cartridge 100 is detected by the cartridge detecting sensor 523. At this time point, the hook of the picker arm 521 mounted in the feeding section 520 is placed in a position facing the notch 110 in the data cartridge 100.

Then, as shown in FIG. 12D, the swivel driving motor 550 is driven to slightly rotate the picker mechanism 500 in a direction shown in FIG. 12D so that the hook of the picker arm 521 is made to connect to the notch 110 of the data cartridge 100 and held in the notch 110 in a fixed manner.

Finally, as shown in FIG. 12E, the picker driving motor 530 is driven to move to a position where the feeding section 520 is fully drawn in the picker frame 510. At this time point, the data cartridge 100 to which the picker arm 521 is made to connect and to be held in a fixed manner is drawn, together the feeding section 520, into the picker frame 510 and is housed in the picker frame 510. Thus, operations of unloading the data cartridge 100 housed in the drive device 600 are now completed.

As described above, the library device of the embodiment is so configured that the picker mechanism 500 grasps the data cartridge 100, not by rotating the picker arm 521 itself, but by moving, after having arranged the picker arm 521 in the vicinity of a side of the data cartridge 100, each picker mechanism 500 by a length of the hook of the picker arm 521 in a direction in which the hook of the picker arm 521 is inserted into the notch 110 formed on the side of the data cartridge 100. As a result, it is not necessary that the picker mechanism 500 is provided with a mechanism to open and close the picker arm 521 and it is possible to miniaturize the picker mechanism 500 itself. Also, it is not necessary that the drive device 600 is provided with space for rotating the picker arm 521 in a portion surrounding the drive device 600, which enables the drive device 600 to be arranged in high density, thus achieving the miniaturization of the library device.

Moreover, operations of unloading the data cartridge 100 from the cell 300 can be performed in the same way as described above.

(4) Operations of Loading Data Cartridge into Drive Device

FIGS. 13A to 13E and 14F to 14I are diagrams explaining operations of loading the data cartridge 100 into the drive device 600. FIGS. 13A to 13E and 14F to 14I each show only the elevator 419 out of components making up the accessor mechanism 400 and also a state in which internal components making up the picker mechanism 500 are seen through.

Before operations of loading the data cartridge 100 into the drive device 600 are started, as shown in FIG. 13A, the lifter mechanism 410 on which the picker mechanism 500 is mounted has been placed in an arbitrary position. At this time point, the feeding section 520 in the picker mechanism 500 has been fully drawn in the picker frame 510 and the data cartridge 100 has been housed in the picker frame 510.

When operations of loading the data cartridge 100 into the drive device 600 are started, as shown in FIG. 13B, the picker mechanism 500 is first moved using the accessor mechanism 400 in the X and Y directions shown in FIG. 3 or the like and the swivel driving motor 550 on the elevator 419 is driven to rotate the picker mechanism 500 so that an aperture portion of the picker frame 510 is placed in a position facing the drive device 600 into which the data cartridge 100 is loaded. At this time point, the aperture portion of the picker frame 510 is made to directly face the drive device 600.

Next, as shown in FIG. 13C, the picker driving motor 530 in the picker mechanism 500 is driven to move the feeding section 520, the data cartridge 100 is moved to a first position in the drive device 600. Moreover, the drive device 600 is provided with an automatic loading mechanism (not shown) which, when the data cartridge 100 is moved to a second position and, thereafter, loads the data cartridge 100 automatically. Since the above first position is located just before the second position in which the auto-loading is started, at this stage, the automatic loading is not yet performed.

Next, as shown in FIG. 13D, the picker driving motor 530 in the picker mechanism 500 is driven in a direction being reverse to the above and the feeding section 520 is slightly drawn back in an inside direction of the picker frame 510. This causes an end of the picker arm 521 having directly contacted the notch 110 in the data cartridge 100 to be separated from the notch 110 [see FIG. 13C (ii) and FIG. 13D (ii)].

Then, as shown in FIG. 13E, the swivel driving motor 550 is driven to slightly rotate the picker mechanism 500 in an arrow direction shown in FIG. 13E, so that the hook of the picker arm 521 is separated from the notch 110 in the data cartridge 100.

After that, as shown in FIG. 14F, the picker driving motor 530 is driven to move the feeding section 520 to a position where the feeding section 520 is drawn fully into the picker frame 510.

Then, as shown in FIG. 14G, the picker mechanism 500 is moved slightly in an X direction shown in FIG. 14G by using the linear mechanism 450 in the accessor mechanism 400 and then, as shown in FIG. 14H, the picker mechanism 500 is made to slightly come down in a Y direction by using the lifter mechanism 410 in the accessor mechanism 400. This causes the cartridge pushing-in section 510a mounted on an upper side of the aperture of the picker frame 510 to be placed in a position facing the data cartridge 100 in the drive device 600.

Finally, as shown in FIG. 14I, the picker mechanism 500 is moved in an arrow direction (X direction) shown in FIG. 14I, the data cartridge 100 is fed to a second position in the drive device 600 in a manner in which the data cartridge 100 is pushed in by the cartridge pushing-in section 510a. This causes the automatic loading mechanism in the drive device 600 to be activated and, thereafter, the data cartridge 100 is automatically loaded in the drive device 600.

Thus, according to the embodiment, with the data cartridge 100 being held by the picker arm 521, after the data cartridge 100 has been loaded into the drive device 600 in a provisional manner, the state in which the picker arm 521 is held in a fixed manner is cancelled and the picker mechanism 500 is totally moved so that the data cartridge 100 is loaded into the drive device 600, by the cartridge pushing-in section 510a, to a position where the automatic loading is started. As a result, it is made possible to smoothly load the data cartridge 100 into the drive device 600 having the automatic loading mechanism. On the other hand, with the data cartridge 100 being held by the picker arm 521, if the data cartridge 100 is loaded into a position where the automatic loading is started in the drive device 600, the data cartridge 100 to be drawn in the drive device 600 by the automatic loading mechanism that has started its operation is pulled by the picker arm 521. As a result, there is a fear of occurrence of a failure in the picker arm 521 or the automatic loading mechanism.

As described above, according to the picker mechanism 500 and the library device of the embodiment, it is not necessary that the picker mechanism 500 is provided with a mechanism to open and close the picker arm 521 and, therefore, the picker mechanism 500 itself can be made smaller in size. Moreover, it is not necessary that space for rotating the picker arm 521 is provided among cells 300 adjacent to one another in the magazine 200 or in areas surrounding the drive device 600 and, therefore, it is made possible for the magazine 200 to arrange cells 300 in a manner in which intervals among the cells 300 are made narrow and, as a result, to house data cartridges 100 in high density and also to arrange the drive device 600 in high density, which enables the library device having the picker mechanism 500 to be miniaturized.

Also, the picker mechanism 500 of the embodiment is so configured that the data cartridge 100 is positioned to the notch 110 by moving the picker arm 521 mounted on a side of the feeding section 520 using the driving section 411, 451 in the accessor mechanisms 400 and 451 each being made up of pulse motors and the picker driving motor 530 and swivel driving motor 550 in the picker mechanism 500. As a result, a displacement of the picker arm 521 from the position of the notch 110 can be corrected based on out-of-step pulses of these pulse motors, it is not necessary that a special mechanism including a photosensor, CCD (Charge Coupled Device) or a like used to detect a position of the picker arm 521 for correcting the displacement is provided, which also enables the library device to be miniaturized.

Furthermore, the picker mechanism 500 of the embodiment is so configured that the data cartridge 100 is loaded and unloaded using the picker arm 521 mounted on a side of the feeding section 520 and, therefore, even when cells 300 in the magazines 200 are provided in multi-stages, unlike the conventional picker mechanism having the picker arm, which is provided on the side of the picker mechanism and moves in a vertical direction, it is not necessary that space for loading the picker arm 521 among data cartridges 100 placed up and down in multi-stages is provided, thus enabling the picker mechanism 500 to be applied even if the cells 300 in the magazine 200 are provided in multi-stages.

It is apparent that the present invention is not limited to the above embodiments but may be changed and modified without departing from the scope and spirit of the invention.

What is claimed is:

1. A picker mechanism for loading and unloading a data cartridge for a read/write drive device that reads and writes data onto a data cartridge, the picker mechanism also for loading and unloading a data cartridge from a data cartridge retaining cell;
   wherein the picker mechanism is in an enviromnent having a plurality of data cartridge retaining cells, each for housing a data cartridge, the plurality of cells arrayed specifically in a magazine,
   wherein the picker mechanism transfers a data cartridge from a preselected cell in the magazine to the drive device, and vice versa;
   the picker mechanism comprising:
   a data cartridge feeding and ejection section including a picker arm immovably attached on one side of the feeding and ejection section;
   a base for supporting the picker mechanism, upon which the data cartridge feeding and ejection section is rotatably mounted; and
   means for moving said feeding and ejection section to draw said feeding and ejection section into said picker mechanism with said picker arm held in a fixed manner in a notch formed on a side of each of said data cartridges during the moving of said feeding and ejection section,
   wherein the data cartridge feeding and ejection section is configured to feed or eject a data cartridge at a selected location after the cartridge feeding and ejection section has rotated a desirable angle.

2. The picker mechanism according to claim 1, wherein said picker arm in said feeding and ejection section is mounted on a side of said data cartridge feeding and ejection section facing the cartridge stored in the retaining cell.

3. The picker mechanism according to claim 1, wherein said data cartridge feeding and ejection section is configured to rotate about an approximately central portion of said picker mechanism and wherein said driving mechanism is configured to move the feeding and ejection section radially from the central portion.

4. A library device comprising:
   at least one drive device to read and write data from and onto storage media housed in a plurality of data cartridges;
   at least one magazine having a plurality of cells each housing one of said plurality of said data cartridges,
   a picker mechanism to load and unload each of said data cartridges on or from said at least one drive device and each of said cells; and
   an accessor mechanism to mount said picker mechanism and to transfer said picker mechanism between said at least one drive device and each of said cells;
   wherein said picker mechanism comprises:
   a swivel mechanism to rotate said picker mechanism on said accessor mechanism,
   a feeding and ejection section having a picker arm immovably attached on one side of said feeding and ejection section; and
   means for moving said feeding and ejection section to draw said feeding and ejection section into said picker mechanism with said picker arm held in a fixed manner in a notch formed on a side of each of said data cartridges during the moving of said feeding and ejection section.

5. The library device according to claim 4, wherein said picker arm in said feeding and ejection section is mounted on a side of said feeding and ejection section facing the cartridge stored in the retaining cell.

6. The library device according to claim 4, wherein said swivel mechanism is configured to rotate said picker mechanism about an approximately central portion of said picker mechanism and wherein said feeding and ejection section driving mechanism is configured to move said feeding and ejection section radially from said central portion.

7. The library device according to claim 4, wherein said library device is so configured as to unload said data cartridge housed in any one of said cells or in said at least one drive device, by performing operations of moving said picker mechanism using the accessor mechanism to make said picker mechanism face said data cartridge being housed in the one of said cells or in said at least one drive device and of rotating said picker mechanism using said swivel mechanism to make an aperture of said picker mechanism face said data cartridge, by performing operations of moving said feeding and ejection section using said feeding and ejection section driving mechanism to make said picker arm be placed in a position facing said notch formed on a side of said data cartridge, by performing an operation of moving said accessor mechanism mounting said picker mechanism to make said picker arm be held in a fixed manner by said notch in said data cartridge, and by performing an operation of moving said feeding and ejection section using said feeding and ejection section driving mechanism to load said data cartridge on said picker mechanism.

8. The library device according to claim 4, wherein said library device is so configured as to load said data cartridge into said cells, by performing operations of moving said picker mechanism with said data cartridge housed in an inside thereof, by using said accessor mechanism, with said picker arm being held in a fixed manner by said notch in said data cartridge, to make said picker mechanism be placed in a position facing said cells housing said data cartridge and of rotating said picker mechanism using said swivel mechanism to make an aperture of said picker mechanism face said cells, by performing an operation of moving said feeding and ejection section using said feeding and ejection section driving mechanism to load said data cartridge in said cells, and by performing an operation of moving said accessor mechanism mounting said picker mechanism to separate said picker arm from said notch in said data cartridge.

9. The library device according to claim 4, wherein said library device is so configured as to unload said data cartridge being housed in said at least one drive device or any one of said cells, by performing operations of moving said picker mechanism using said accessor mechanism to make said picker mechanism be placed in a position facing said data cartridge being housed in said at least one drive device or the one of said cells and of rotating said picker mechanism using said swivel mechanism to make an aperture of said picker mechanism face said data cartridge, with the aperture of said picker mechanism being made slant in a direction of a side on which said picker arm in said feeding and ejection section is mounted, by performing an operation of moving said feeding and ejection section using said feeding and ejection section driving mechanism to make said picker arm be placed in a position facing said notch formed on a side of said data cartridge, by performing an operation of rotating said picker mechanism using said swivel mechanism to make said picker arm be held in a fixed manner by said notch in said data cartridge, and by performing an operation of moving said feeding and ejection section using said feeding and ejection section driving mechanism to load said data cartridge into said picker mechanism.

10. The library device according to claim 4, wherein said library device is so configured as to load said data cartridge into said at least one drive device by performing operations of moving said picker mechanism housing said data cartridge in an internal portion in said picker mechanism using said accessor mechanism, with said picker arm being held in a fixed manner by said notch in said data cartridge, to make said picker mechanism be placed in a position facing said at least one drive device housing said data cartridge and of rotating said picker mechanism using said swivel mechanism to make an aperture of said picker mechanism directly face said at least one drive device, by performing an operation of moving said feeding and ejection section using said feeding and ejection section driving mechanism to insert said data cartridge to a first position in said at least one drive device, by performing an operation of rotating said picker mechanism using said swivel mechanism to separate said picker arm from said notch in said data cartridge, by performing an operation of moving said feeding and ejection section using said feeding and ejection section driving mechanism to draw said feeding and ejection section into said picker mechanism, and by performing an operation of moving said picker mechanism using said accessor mechanism to make a cartridge pushing-in section being mounted in an aperture of said accessor mechanism be placed in a position facing said data cartridge, and by performing an operation of moving said picker mechanism using said accessor mechanism to insert said data cartridge to a second position in said at least one drive device, so that said cartridge pushing-in section pushes said data cartridge into said at least one drive device.

* * * * *